(12) United States Patent
Yeo et al.

(10) Patent No.: US 11,032,777 B2
(45) Date of Patent: Jun. 8, 2021

(54) METHOD AND APPARATUS FOR UPLINK POWER CONTROL IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Seunghoon Choi, Gyeonggi-do (KR); Taehyoung Kim, Seoul (KR); Youngbum Kim, Seoul (KR); Jinyoung Oh, Seoul (KR); Youngwoo Kwak, Gyeonggi-do (KR); Sungjin Park, Incheon (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/492,870

(22) PCT Filed: Mar. 20, 2018

(86) PCT No.: PCT/KR2018/003242
§ 371 (c)(1),
(2) Date: Sep. 10, 2019

(87) PCT Pub. No.: WO2018/174530
PCT Pub. Date: Sep. 27, 2018

(65) Prior Publication Data
US 2020/0077343 A1  Mar. 5, 2020

(30) Foreign Application Priority Data

Mar. 23, 2017 (KR) .......... 10-2017-0037123
May 4, 2017 (KR) .......... 10-2017-0056949

(51) Int. Cl.
*H04W 52/14* (2009.01)
*H04W 52/24* (2009.01)
*H04W 72/04* (2009.01)

(52) U.S. Cl.
CPC ......... *H04W 52/146* (2013.01); *H04W 52/24* (2013.01); *H04W 72/042* (2013.01); *H04W 72/0446* (2013.01)

(58) Field of Classification Search
CPC . H04W 52/146; H04W 52/24; H04W 72/042; H04W 72/0446
(Continued)

(56) References Cited

U.S. PATENT DOCUMENTS

2003/0108013 A1\* 6/2003 Hwang ................ H04W 52/40
370/335
2012/0009923 A1 1/2012 Chen et al.
(Continued)

FOREIGN PATENT DOCUMENTS

KR  1020120112686  10/2012
KR  1020150105329   9/2015
(Continued)

OTHER PUBLICATIONS

PCT/ISA/210 Search Report issued on PCT/KR2018/003242, pp. 5.
(Continued)

*Primary Examiner* — Obaidul Huq
(74) *Attorney, Agent, or Firm* — The Farrell Law Firm, P.C.

(57) ABSTRACT

This disclosure relates to a communication technique and a system thereof that fuses a 5G communication system with IoT technology so as to support higher data transmission rates than 4G systems. This disclosure can be applied to intelligent services (for example, smart home, smart building, smart city, smart car or connected car, services related to healthcare, digital education, retail, security, and safety, or the like) on the basis of 5G communication technology and IoT related technology. The present invention relates to a wireless communication system, and relates to a method and
(Continued)

an apparatus that control the power of an uplink transmission signal. More specifically, disclosed is a method in which power in uplink transmission is controlled by a terminal that has received delay reduction mode settings.

16 Claims, 9 Drawing Sheets

(58) Field of Classification Search
USPC .............................. 370/310, 328, 329, 336
See application file for complete search history.

(56) References Cited

U.S. PATENT DOCUMENTS

| | | | |
|---|---|---|---|
| 2013/0163543 | A1 | 6/2013 | Freda et al. |
| 2015/0358916 | A1 | 12/2015 | Park et al. |
| 2016/0128028 | A1 | 5/2016 | Mallick et al. |
| 2016/0323887 | A1* | 11/2016 | Patel ............... H04W 52/34 |
| 2019/0037562 | A1* | 1/2019 | Park ............... H04L 5/00 |
| 2019/0342864 | A1* | 11/2019 | Hwang ............ H04L 5/0053 |

FOREIGN PATENT DOCUMENTS

| | | |
|---|---|---|
| KR | 1020180010949 | 1/2018 |
| WO | WO 2011/090688 | 7/2011 |

OTHER PUBLICATIONS

PCT/ISA/237 Written Opinion issued on PCT/KR2017/003242, pp. 6.
Huawei, HiSilicon, 3GPP TSG RAN WG1 Meeting #88, R1-1701738, Athens, Greece, Feb. 6, 2017, "UL power control for short TTI", pp. 6.
Ericsson, 3GPP TSG RAN WG1 Meeting #84bis, R1-163322, Busan, Apr. 1, 2016, "Downlink control signaling design for short TTI", pp. 6.
Huawei, HiSilicon, 3GPP TSG RAN WG1 Meeting #88, R1-1701769, Athens, Greece, Feb. 6, 2017, "Discussion on CA issues for shortened TTI operation", pp. 4.
European Search Report dated Jan. 27, 2020 issued in counterpart application No. 18772092.5-1205, 5 pages.
Huawei, HiSilicon, "Remaining Issues on Shortened Processing Time for 1ms TTI", R1-1611168, 3GPP TSG RAN WG1 Meeting #87, Nov. 14-18, 2016, 6 pages.
Korean Office Action dated Mar. 9, 2021 issued in counterpart application No. 10-2017-0056949, 14 pages.

* cited by examiner

METHOD AND APPARATUS FOR UPLINK POWER CONTROL IN WIRELESS CELLULAR COMMUNICATION SYSTEM

PRIORITY

This application is a National Phase Entry of PCT International Application No. PCT/KR2018/003242 which was filed on Mar. 20, 2018, and claims priority to Korean Patent Application Nos. 10-2017-0037123 and 10-2017-0056949, which were filed on Mar. 23, 2017 and May 4, 2017, respectively, the content of each of which is incorporated herein by reference.

TECHNICAL FIELD

The disclosure relates to a wireless communication system and, more particularly, to a method and an apparatus for controlling power of an uplink transmission signal. More specifically, the disclosure relates to a method for controlling power in uplink transmission by a terminal configured in a latency reduction mode.

BACKGROUND ART

To meet the demand for wireless data traffic having increased since commercialization of 4G communication systems, efforts have been made to develop an improved 5G communication system, a pre-5G communication system, or a new radio (NR) system. Therefore, the 5G communication system or the pre-5G communication system is called a "beyond 4G network communication system" or a "post-LTE system".

The 5G communication system is considered to be implemented in super-high frequency (mmWave) bands (e.g., a band of 60 GHz) so as to accomplish higher data rates. In order to reduce propagation loss of the radio waves and in order to increase the transmission distance of the radio waves in super-high frequency bands, techniques, such as beamforming, massive multiple-input multiple-output (MIMO), full dimensional MIMO (FD-MIMO), array antennas, analog beamforming, and large scale antennas, are being discussed in 5G communication systems.

In addition, development is under way for system network improvement in 5G communication systems based on evolved small cells, advanced small cells, cloud radio access networks (cloud RANs), ultra-dense networks, device-to-device (D2D) communication, wireless backhaul, moving networks, cooperative communication, coordinated multi-points (CoMP), reception-end interference cancellation, and the like.

Furthermore, in the 5G system, hybrid FSK and QAM modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology are being developed.

Meanwhile, the Internet, which is a human centered connectivity network where humans generate and consume information, is now evolving to the Internet of Things (IoT) where distributed entities, such as things, exchange and process information. The Internet of Everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine type communication (MTC), and the like, have been recently researched. An IoT environment may provide intelligent Internet technology (IT) services that create a new value to human life by collecting and analyzing data generated from connected things. The IoT may be applied to a variety of fields, such as smart homes, smart buildings, smart cities, smart cars or connected cars, smart grids, healthcare, smart appliances, and advanced medical services, through convergence and combination between existing information technology (IT) and various industries.

In line with this, various attempts have been made to apply 5G communication systems to IoT networks. For example, technologies, such as a sensor network, machine-to-machine (M2M) communication, machine type communication (MTC), and the like, are being implemented by 5G communication techniques, such as beamforming, MIMO, array antennas, and the like. Application of a cloud radio access network (RAN) as the above-described big data processing technology may also be considered to be as an example of convergence between the 5G technology and the IoT technology.

As described above, a plurality of services may be provided to users in the communication systems, and a method capable of providing respective services conforming to the features thereof during the same time interval and a device using the same are required in order to provide the plurality of services to users.

DISCLOSURE OF INVENTION

Technical Problem

It is an aspect of the disclosure to provide a method in which a terminal configured in a latency reduction mode performs power control for uplink transmission and an apparatus thereof.

Solution to Problem

In order to solve the above problems, a method of a terminal may include: receiving, from a base station, downlink control information containing an uplink grant by a terminal configured with a short processing time; determining a time point for transmitting an uplink signal as a first time point or a second time point preceding the first time point based on the downlink control information; determining uplink transmission power for transmitting the uplink signal based on the determined time point; and transmitting the uplink signal to the base station based on the determined transmission power.

A terminal to solve the above problems may include: a transceiver configured to transmit and receive signals; and a controller configured to allow a terminal configured with a short processing time to receive downlink control information containing an uplink grant from a base station, determine a time point for transmitting an uplink signal as a first time point or a second time point preceding the first time point based on the downlink control information, determine uplink transmission power for transmitting the uplink signal based on the determined time point, and transmit the uplink signal to the base station based on the determined transmission power.

In order to solve the above problems, a method of a base station may include: transmitting downlink control information containing an uplink grant to a base station configured with a short processing time; and receiving, from the terminal, an uplink signal at a first time point or a second time point preceding the first time point determined based on the downlink control information, wherein uplink transmission power of the uplink signal is determined by the terminal based on the determined time point.

A base station to solve the above problems may include: a transceiver configured to transmit and receive signals; and a controller configured to transmit downlink control information containing an uplink grant to a terminal configured with a short processing time and configured to receive, from the terminal, an uplink signal at a first time point or a second time point preceding the first time point determined based on the downlink control information, wherein uplink transmission power of the uplink signal is determined by the terminal based on the determined time point.

Advantageous Effects of Invention

According to an embodiment of the disclosure, it is possible to provide a power control method for transmitting an uplink signal in a latency reduction mode operation of a base station and a terminal, thereby enabling efficient network operating.

MODE FOR THE INVENTION

Figure 1:
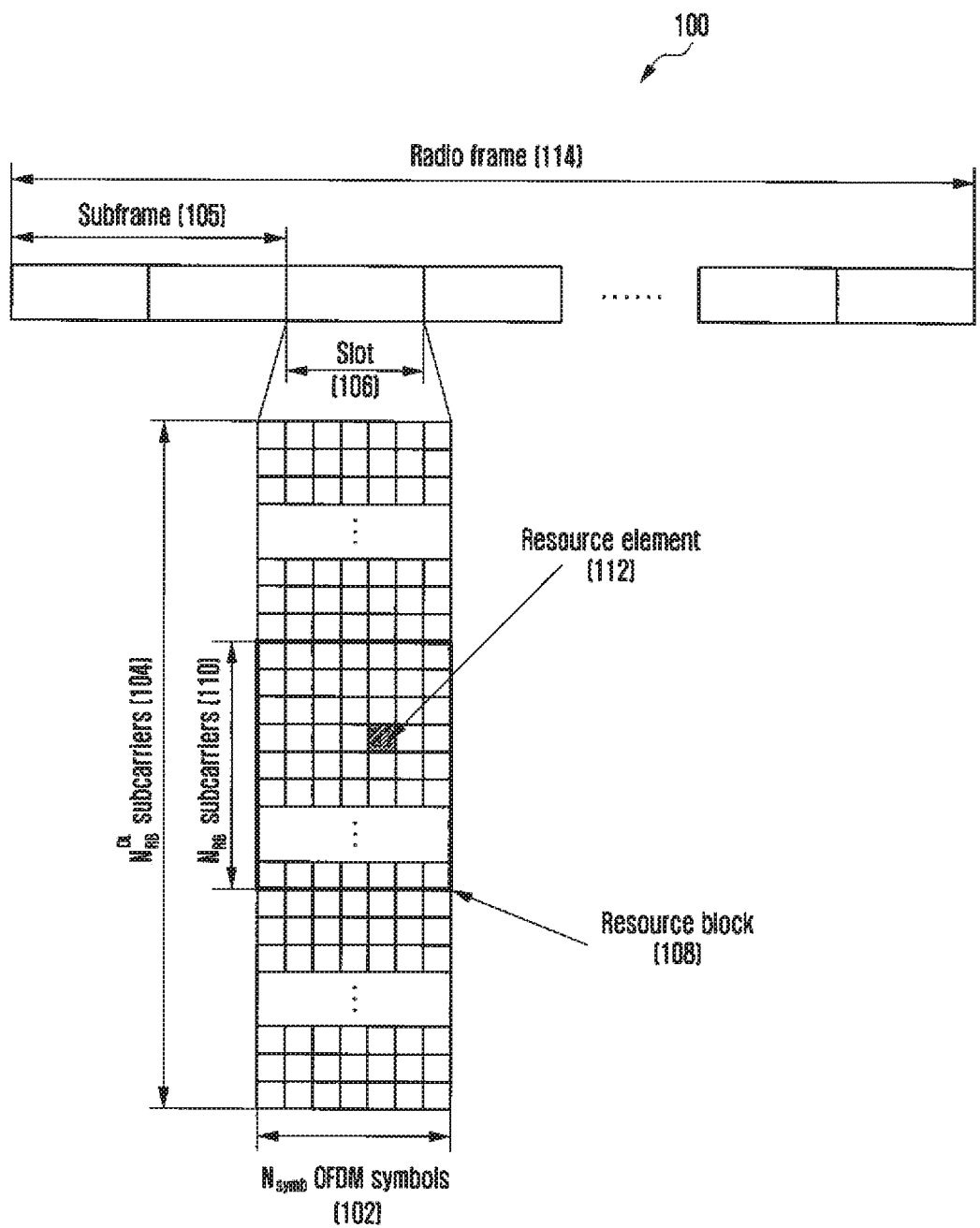
FIG. 1 is a diagram illustrating a downlink time-frequency domain transmission structure of an LTE or LTE-A system.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, "unit" may include one or more processors.

The wireless communication system is advancing to a broadband wireless communication system for providing high-speed and high-quality packet data services using communication standards, such as high-speed packet access (HSPA) of 3GPP, long-term evolution (LTE) or evolved universal terrestrial radio access (E-UTRA), LTE-advanced (LTE-A), high-rate packet data (HRPD) of 3GPP2, ultra mobile broadband (UMB), IEEE 802.16e, and the like, as well as typical voice-based services. In addition, 5G or new radio communication standards are being established as $5^{th}$ generation wireless communication systems.

In wireless communication systems including the $5^{th}$ generation wireless communication system described above, at least one of enhanced mobile broadband (eMBB), massive machine type communications (mMTC), and ultra-reliable and low-latency communications (URLLC) may be provided to a terminal. The above services may be provided to the same terminal during the same time interval. In the embodiment, the eMBB may aim at high-speed transmission of high-capacity data, the mMTC may aim at minimization of terminal power and connections of multiple terminals, and the URLLC may aim at high reliability and low latency, but they are limited thereto. The three services above may be major scenarios in an LTE system or a 5G/NR (new radio or next radio) system subsequent to the LTE system. In the embodiment, a coexistence method of the eMBB and the URLLC or a coexistence method of the mMTC and the URLLC and an apparatus using the same will be described.

In the case where a base station has scheduled data corresponding to an eMBB service to a terminal in a specific transmission time interval (TTI), if URLLC data is required to be transmitted during the TTI, some of the eMBB data may not be transmitted in the frequency band for transmitting the scheduled eMBB data, thereby transmitting the required URLLC data in the above frequency band. A terminal scheduled with the eMBB and a terminal scheduled with the URLLC may be the same, or may be different from each other. In this case, since some of the eMBB data that has already been scheduled and is in the middle of transmission is not transmitted, there is a possibility that the eMBB data is damaged. Therefore, it is necessary to determine a method of processing a signal received by the terminal scheduled with the eMBB or the terminal scheduled with the URLLC and a method of receiving a signal by the same in the above case. Accordingly, the embodiment will describe a coexistence method between heterogeneous services capable of transmitting information according to respective services when information according to the eMBB and the URLLC is scheduled by sharing a portion or the whole of the frequency band, when information according to the mMTC and the URLLC is scheduled simultaneously, when information according to the mMTC and the eMBB is scheduled simultaneously, or when information according to the eMBB, the URLLC, and the mMTC is scheduled simultaneously.

Hereinafter, embodiments of the disclosure will be described in detail with reference to the accompanying drawings. In the following description of the disclosure, a detailed description of known functions or configurations incorporated herein will be omitted if it may obscure the subject matter of the disclosure. In addition, the terms used herein are defined in consideration of the functions thereof in the disclosure, and may be varied according to the intention of the user or operator, or practices. Therefore, the definition thereof must be based on the content throughout this specification. Hereinafter, a base station, which is an entity performing resource allocation with respect to a terminal, may be at least one of eNode B, Node B, a base station (BS), a wireless access unit, a base station controller, or a node in a network. A terminal may include user equipment (UE), a mobile station (MS), a cellular phone, a smart phone, a computer, or a multimedia system capable of performing communication functions. In the disclosure, a downlink (DL) is a wireless transmission path of a signal transmitted from the base station to the terminal, and an uplink (UL) is a wireless transmission path of a signal transmitted from the terminal to the base station. In addition, although the embodiments of the disclosure will be described below by way of example as LTE or LTE-A systems, the embodiments of the disclosure may be applied to other communication systems having similar technical backgrounds or channel forms. For example, the embodiments of the disclosure may be applied to $5^{th}$ generation mobile communication technologies (5G, new radio, NR, etc.) developed subsequent to the LTE-A system. Further, the embodiments of the disclosure may be applied to other communication systems through some modifications thereof without departing from the scope of the disclosure according to judgment by those skilled in the art.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers to a radio link through which the terminal {user equipment (UE) or mobile station (MS)} transmits data or control signals to the base station (BS) (or eNode B), and the downlink refers to a radio link through which the base station transmits data or control signals to the terminal. The above multiple access scheme may separate data or control information of respective users by allocating and operating time-frequency resources for transmitting the data or control information for the respective users so as to avoid overlapping each other (that is, so as to establish orthogonality).

The LTE system employs a hybrid automatic repeat reQuest (HARQ) scheme in which if decoding failure occurs in initial transmission, a physical layer retransmits the corresponding data. The HARQ scheme is a technique in which a receiver transmits, to a transmitter, a negative acknowledgment (NACK) indicating decoding failure if the receiver fails to correctly decode the data, thereby enabling the transmitter to retransmit the corresponding data in a physical layer. The receiver combines data retransmitted by the transmitter with the data the decoding of which has previously failed, thereby improving data reception performance. In addition, if the receiver correctly decodes the data, the receiver may transmit, to the transmitter, an acknowledgment (ACK) indicating the success of decoding so that the transmitter may transmit new data.

Especially, in the conventional LTE system, among the wireless communication systems, HARQ ACK or NACK information indicating whether or not data transmission is successful is transmitted to the base station through the uplink 3 ms after receiving downlink data. For example, HARQ ACK/NACK information of a physical downlink shared channel (PDSCH) that the terminal receives from the base station in subframe n is transmitted to the base station through a physical uplink control channel (PUCCH) or a physical uplink shared channel (PUSCH) in subframe n+4.

In addition, in an FDD LTE system, the base station may transmit, to the terminal, downlink control information (DCI) including uplink resource allocation information, or may request retransmission through a physical hybrid ARQ indicator channel (PHICH). If the terminal receives an uplink data transmission scheduling in subframe n as described above, the terminal performs uplink data transmission in subframe n+4. That is, the terminal performs PUSCH transmission in subframe n+4. The above example describes the LTE system using FDD, and in the LTE system using TDD, the HARQ ACK/NACK transmission timing or the PUSCH transmission timing may be varied depending on the uplink-downlink subframe configuration, which is performed according to a predetermined rule.

In the LTE system using FDD or TDD, the HARQ ACK/NACK transmission timing or the PUSCH transmission timing is predetermined to conform to the case where the time for the signal processing of the base station and the terminal is about 3 ms. However, if the LTE base station and the terminal reduce the signal processing time to 1 ms or 2 ms, the latency time for data transmission may be reduced.

When the terminal supporting transmission for reduction in the latency time is configured in a latency reduction mode as described above, the HARQ-ACK timing for downlink data or the uplink data transmission timing for an uplink data grant may be varied depending on a search space in which the DCI is detected. For example, if the DCI is detected in a common search space, the terminal operates according to timing n+4, or if the DCI is detected in a UE-specific search space, the terminal may operate according to timing n+3. If the terminal configured in the latency reduction mode, as described above, receives a scheduling in the common search space in one subframe and operates according to timing n+4, and if the terminal receives a scheduling in the UE-specific search space in the next subframe and operates according to timing n+3, there may be a collision in which the HARQ-ACK transmissions or the PUSCH transmissions for two scheduling signals occur in the same subframe. Therefore, in order to solve such a problem, if the base station transmits, to a specific terminal configured in the latency reduction mode, a scheduling in the common search space in any one subframe, and thus if the terminal operates according to timing n+4, the base station may not transmit a scheduling for the operation with timing n+3 in the next subframe, thereby preventing the above collision.

FIG. 1 is a diagram illustrating a basic structure of a time-frequency domain, which is a radio resource domain for transmitting the data or control channel in a downlink in an LTE system or a system similar thereto.

Referring to FIG. 1, the horizontal axis represents a time domain, and the vertical axis represents a frequency domain. The minimum transmission unit in the time domain is an OFDM symbol. $N_{symb}$ OFDM symbols 102 constitute one slot 106, and two slots constitute one subframe 105. The length of the slot is 0.5 ms, and the length of the subframe is 1.0 ms. In addition, a radio frame 114 is a time domain unit including 10 subframes. The minimum transmission unit in the frequency domain is a subcarrier, and the entire system transmission bandwidth includes a total of $N_{BW}$ subcarriers 104. However, detailed numerals described above may be variably applied.

The basic resource unit in the time-frequency domain is a resource element (RE) 112, which may be indicated by an OFDM symbol index and a subcarrier index. A resource block (RB) 108 {or physical resource block (PRB)} may be defined by consecutive $N_{symb}$ OFDM symbols 102 in the time domain and consecutive $N_{RB}$ subcarriers 110 in the frequency domain. Thus, one RB 108 may include $N_{symb} \times N_{RB}$ REs 112 in one slot. In general, the minimum allocation unit of data in the frequency domain is an RB. The LTE system generally shows $N_{symb}=7$ and $N_{RB}=12$, and $N_{BW}$ and $N_{RB}$ may be proportional to the bandwidth of a system transmission band. The data rate increases in proportion to the number of RBs scheduled to the terminal. The LTE system may define and operate six transmission bandwidths. In the case of the FDD system in which the downlink and the uplink are separated by frequency, the downlink transmission bandwidth and the uplink transmission bandwidth may be different from each other. The channel bandwidth represents an RF bandwidth corresponding to the system transmission bandwidth. Table 1 below shows a relationship between the system transmission bandwidth and the channel bandwidth defined in the LTE system. For example, an LTE system having a channel bandwidth of 10 MHz may have a transmission bandwidth including 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The downlink control information may be transmitted within the first N OFDM symbols in the subframe. In the embodiment, in general, N={1, 2, 3}. Therefore, the value N may be variably applied to each subframe according to the amount of control information to be transmitted in the current subframe. The transmitted control information may include a control channel transmission interval indicator indicating the number of OFDM symbols through which the control information is transmitted, scheduling information of downlink data or uplink data, and information on HARQ ACK/NACK.

In the LTE system, scheduling information about downlink data or uplink data is transmitted from the base station to the terminal through downlink control information (DCI). The DCI may be defined as various kinds of formats, and the DCI may show whether it is scheduling information about uplink data (UL grant) or scheduling information about downlink data (DL grant), whether or not it is compact DCI with a small amount of control information, whether or not spatial multiplexing using multiple antennas is applied, or whether or not the DCI is intended for power control, according to respective formats. For example, DCI format 1, which is scheduling control information about downlink data (DL grant), may include at least one piece of the following control information.

Resource allocation type 0/1 flag: this indicates resource allocation type 0 or 1. Type 0 allocates resources by a resource block group (RBG) while applying a bitmap scheme. In the LTE system, the basic unit of scheduling is an RB represented by time and frequency domain resources, and the RBG includes a plurality of RBs and becomes a basic unit of scheduling in type 0. Type 1 allocates a specific RB in the RBG.

Resource block assignment: this indicates the RBs assigned for data transmission. The resources to be expressed are determined according to system bandwidths and resource allocation schemes.

Modulation and coding scheme (MCS): this indicates a modulation scheme used for data transmission and the size of a transport block, which is the data to be transmitted.

HARQ process number: this indicates a HARQ process number.

New data indicator: this indicates initial HARQ transmission or retransmission

Redundancy version: this indicates a redundancy version of HARQ.

Transmit power control (TPC) command for physical uplink control channel (PUCCH): this indicates a transmission power control command for a PUCCH, which is an uplink control channel.

The DCI may go through a channel coding and modulation process, and may then be transmitted through a physical downlink control channel (PDCCH) (or control information, hereinafter, the PDCCH and the control information will be interchangeably used with each other) or an enhanced PDCCH (EPDCCH) (or enhanced control information, hereinafter, the EPDCCH and the enhanced control information will be interchangeably used with each other), which is a downlink physical control channel.

In general, the DCI is scrambled with a specific radio network temporary identifier (RNTI) (or a terminal identifier) independently for each terminal so that cyclic redundancy check (CRC) is added, is channel-coded, and is configured as an independent PDCCH to then be transmitted. In the time domain, the PDCCH is mapped and transmitted during a control channel transmission interval. The frequency domain mapping position of the PDCCH may be determined by an identifier (ID) of each terminal, and may be transmitted over all system transmission bands.

The downlink data may be transmitted through a physical downlink shared channel (PDSCH), which is a physical channel for downlink data transmission. The PDSCH may be transmitted after the control channel transmission interval, and scheduling information, such as a specific mapping position in the frequency domain, the modulation scheme, and the like, is determined by the DCI transmitted through the PDCCH.

The base station notifies the terminal of the modulation scheme applied to the PDSCH to be transmitted to the terminal and the size of data {transport block size (TBS)} to be transmitted through the MCS, among the control information constituting the DCI. In the embodiment, the MCS may include five bits or more or less. The TBS corresponds to the size before channel coding for error correction is applied to the data {i.e., transport block (TB)} to be transmitted by the base station.

The modulation schemes supported by the LTE system are quadrature phase shift keying (QPSK), 16-quadrature amplitude modulation (16QAM), and 64QAM, and their modulation orders (Qm) correspond to 2, 4, and 6, respectively. That is, 2 bits per symbol can be transmitted in the QPSK modulation; 4 bits per symbol can be transmitted in the 16QAM; and 6 bits per symbol can be transmitted in the 64QAM. In addition, modulation schemes of 256QAM or more may be used according to system modification.

Figure 2:
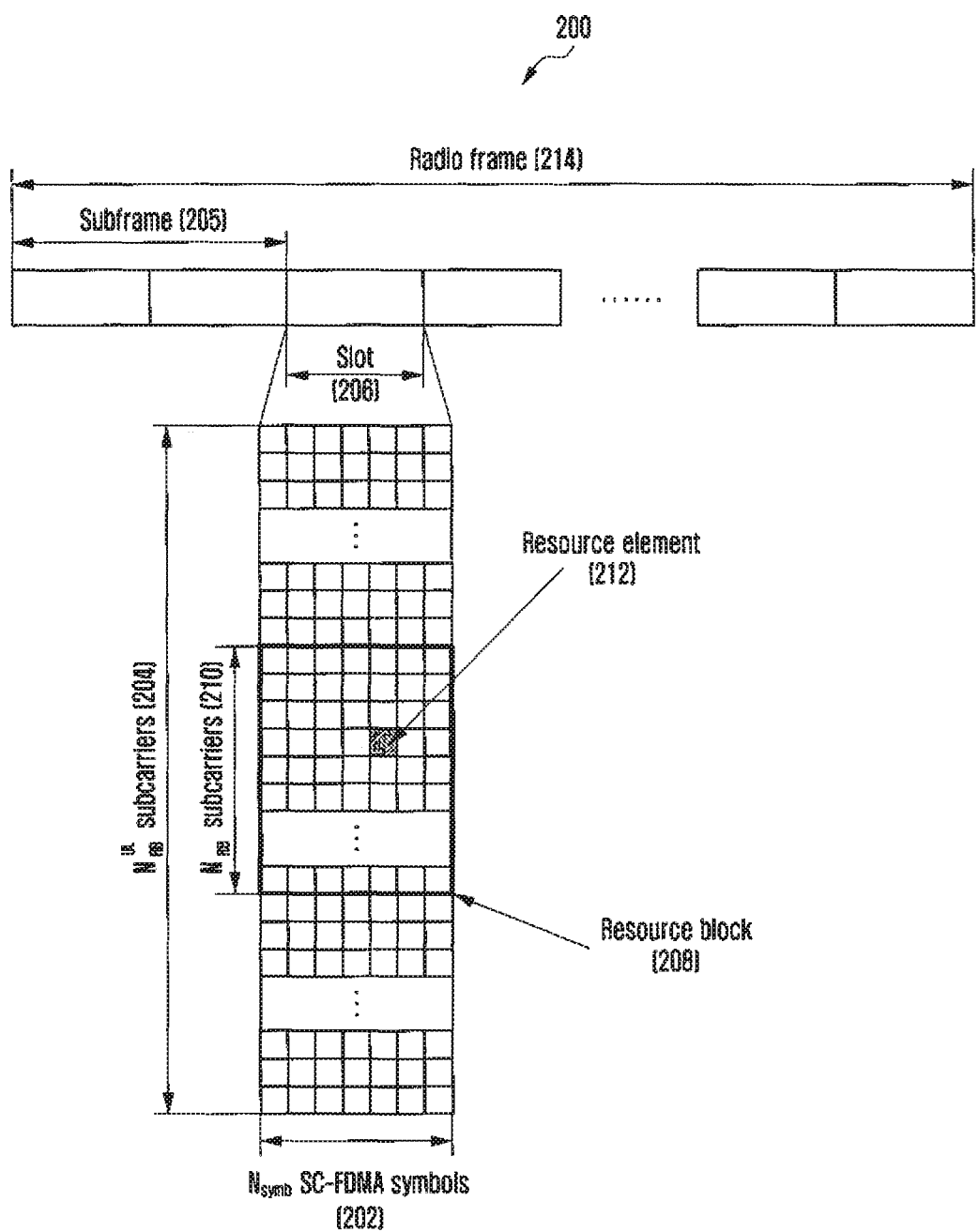
FIG. 2 is a diagram illustrating an uplink time-frequency domain transmission structure of an LTE or LTE-A system.

FIG. 2 is a diagram illustrating a basic structure of a time-frequency domain, which is a radio resource domain for transmitting data or control channel in an uplink in an LTE-A system.

Referring to FIG. 2, the horizontal axis represents a time domain, and the vertical axis represents a frequency domain. The minimum transmission unit in the time domain is an SC-FDMA symbol 202, and $N_{symb}^{UL}$ SC-FDMA symbols may constitute one slot 206. In addition, two slots constitute one subframe 205. The minimum transmission unit in the frequency domain is a subcarrier, and the entire system transmission bandwidth 204 includes a total of $N_{BW}$ subcarriers. $N_{BW}$ may have a value proportional to the system transmission band.

The basic resource unit in the time-frequency domain is a resource element (RE) 212, which may be defined by an SC-FDMA symbol index and a subcarrier index. A resource block (RB) pair 208 may be defined by consecutive $N_{symb}^{UL}$ SC-FDMA symbols in the time domain and consecutive $N_{SC}^{RB}$ subcarriers in the frequency domain. Thus, one RB includes $N_{symb}^{UL} \times N_{SC}^{RB}$ REs. In general, the minimum transmission unit of data or control information is an RB. The PUCCH is mapped with a frequency domain corresponding to 1 RB and is transmitted for 1 subframe.

In the LTE system, it may be possible to define a timing relationship of a PDSCH, which is a physical channel for downlink data transmission, or a PUCCH or PUSCH, which is an uplink physical channel through which HARQ ACK/NACK corresponding to a PDCCH/EPDDCH including semi-persistent scheduling release (SPS release) is transmitted. For example, in the LTE system operating in frequency division duplex (FDD), the HARQ ACK/NACK corresponding to a PDCCH/EPDCCH including the PDSCH or SPS release transmitted in the $(n-4)^{th}$ subframe may be transmitted through a PUCCH or a PUSCH in the $n^{th}$ subframe.

In the LTE system, the downlink HARQ employs an asynchronous HARQ scheme in which the data retransmission time point is not fixed. That is, when HARQ NACK is received as feedback from the terminal in response to the initial transmission data transmitted by the base station, the base station freely determines the transmission time point of the retransmission data by scheduling operation. The terminal may perform buffering on the data determined to be an error as a result of decoding the received data for HARQ operation, and may perform combining with the next retransmission data.

TDD UL/DL configuration in the LTE system may be defined as shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table of the TDD UL/DL configurations 0 to 6, D denotes a downlink subframe, U denotes an uplink subframe, and S denotes a special subframe. The special subframe may also have configurations 0 to 10, wherein special subframe configurations 0 to 9 are not available for uplink data transmission in the special subframe, and wherein special subframe configuration 10 is available for uplink data transmission, i.e., PUSCH transmission, in the special subframe.

HARQ ACK/NACK information of the PDSCH transmitted in subframe n-k is transmitted from the terminal to the base station through the PUCCH or PUSCH in subframe n, where k may be defined differently depending on the FDD or TDD (time division duplex) of the LTE system and the subframe configuration thereof. For example, in the case of the FDD LTE system, k is fixed to 4. On the other hand, in the case of the TDD LTE system, k may vary depending on the subframe configuration and the subframe number. In addition, the value k may be differently applied according to the TDD configuration of each carrier when transmitting data through a plurality of carriers. In the case of the TDD, the value k is determined according to the TDD UL/DL configuration as shown in Table 3 below.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Unlike the downlink HARQ in the LTE system, the uplink HARQ employs a synchronous HARQ scheme in which the data transmission time point is fixed. That is, an uplink/downlink timing relationship of a physical uplink shared channel (PUSCH), which is a physical channel for uplink data transmission, a PDCCH, which is a downlink control channel preceding the same, and a physical hybrid indicator channel (PHICH), which is a physical channel for transmitting downlink HARQ ACK/NACK corresponding to the PUSCH, may have the following rules for transmission and reception.

If the terminal receives a PDCCH including the uplink scheduling control information transmitted from the base station or a PHICH through which the downlink HARQ ACK/NACK is transmitted in subframe n, the terminal transmits uplink data corresponding to the control information through a PUSCH in subframe n+k. In this case, k may be defined differently depending on the FDD or TDD (time division duplex) of the LTE system and configuration thereof. For example, in the case of the FDD LTE system, k may be fixed to 4. On the other hand, in the case of the TDD LTE system, k may vary depending on the subframe configuration and the subframe number. In addition, the value k may be differently applied according to the TDD configuration of each carrier when transmitting data through a plurality of carriers. In the case of the TDD, the value k is determined according to TDD UL/DL configuration as shown in Table 4 below.

TABLE 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | 4 | | 6 | | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Meanwhile, HARQ-ACK information of the PHICH transmitted in subframe i is related to the PUSCH transmitted in subframe i-k. For the FDD system, k is given as 4. That is, the HARQ-ACK information of the PHICH transmitted in subframe i in the FDD system is related to the PUSCH transmitted in subframe i-4. In case of the TDD system, if a terminal that is not configured with EIMTA is configured with respect to only one serving cell or is configured with the same TDD UL/DL configuration, the value k may be given as shown in Table 5 below for TDD UL/DL configurations 1 to 6.

TABLE 5

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | | 7 | 4 | | |
| 1 | | 4 | | | 6 | | 4 | | | 6 |
| 2 | | | 6 | | | | 6 | | | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

That is, for example, in TDD UL/DL configuration 1, the PHICH transmitted in subframe 6 may be the HARQ-ACK information of the PUSCH transmitted in subframe 2 preceding by four subframes.

If the HARQ-ACK is received in the PHICH resource corresponding to $I_{PHICH}=0$ for TDD UL/DL configuration 0, the PUSCH indicated by the HARQ-ACK information is the one that was transmitted in subframe i-k, where k is given according to Table 4. If the HARQ-ACK is received in the PHICH resource corresponding to $I_{PHICH}=1$ for TDD UL/DL configuration 0, the PUSCH indicated by the HARQ-ACK information is the one that was transmitted in subframe i-6.

A terminal that is not able to transmit the PUCCH and the PUSCH at the same time may calculate the power $P_{PUSCH,c}(i)$, which is used for transmission of the PUSCH to be transmitted in subframe i in a specific serving cell c, as follows.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$ [Equation 1]

A terminal capable of transmitting the PUCCH and the PUSCH at the same time may calculate the power $P_{PUSCH,c}(i)$, which is used for transmission of the PUSCH to be transmitted in subframe i in a specific serving cell c, as follows.

$$P_{PUSCH,c}(i) = \quad \text{[Equation 2]}$$

$$\min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} \text{[dBm]}$$

In the above equations, $P_{CMAX,c}(i)$ is the configured power that the terminal is able to transmit in subframe i in the serving cell c. $\hat{P}_{CMAX,c}(i)$ is a linear modification value of $P_{CMAX,c}(i)$, and $\hat{P}_{PUCCH}(i)$ is a linear modification value of $P_{PUCCH}(i)$, which is PUCCH transmission power. $M_{PUSCH,c}(i)$ is the number of PRBs allocated to be used for PUSCH transmission in subframe i in the serving cell c. $P_{O\_PUSCH,c}(j)$ is a value obtained by the parameters transmitted in higher signaling. $\alpha_c$ is one of values $\alpha_c \in \{0, 0.4, 0.5, 0.6, 0.7, 0.8, 0.9, 1\}$, which may be transmitted in higher signaling. $PL_c$ is a downlink pathloss estimation value, which may be obtained by the terminal. $\Delta_{TF,c}(i) = 10\log_{10}((2^{BPRE \cdot K_s}-1))$. $\beta_{offset}^{PUSCH}$ is a value that may be determined according to a control signal portion transmitted in the PUSCH. In an absolute value mode of power control, $\delta_{PUSCH,c}$ is a value that may be configured according to TPC commands included in DCI formats for uplink scheduling such as DCI formats 0/4 or DCI formats 0A/0B/4A/4B of the PDCCH or the EPDCCH. In an accumulation mode of power control, $\delta_{PUSCH,c}$ is a value may be configured according to TPC commands included in DCI formats for uplink scheduling, such as DCI formats 0/4 or DCI formats 0A/0B/4A/4B of the PDCCH or the EPDCCH, or included in DCI formats for power control such as DCI formats 3/3A.

In the above description, if the power control is configured as the absolute value mode, instead of the accumulation mode, $f_c(i)$ may be calculated as $f_c(i) = \delta_{PUSCH,c}(i-K_{PUSCH})$, and it may be calculated as $f_c(i) = f_c(i-1) + \delta_{PUSCH,c}(i-K_{PUSCH})$ in the accumulation mode.

$K_{PUSCH}$ is 4 in the FDD system, and the value indicated by in the TDD system may be provided as shown in Table 6 below.

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 7 | 4 | | | 6 | 7 | 4 |
| 1 | | | 6 | 4 | | | | 6 | 4 | |
| 2 | | | 4 | | | | | 3 | | |
| 3 | | | 4 | 4 | 4 | | | | | |
| 4 | | | 4 | 4 | | | | | | |
| 5 | | | 4 | | | | | | | |
| 6 | | | 7 | 5 | 5 | | | 7 | 7 | |

In case of TDD UL/DL configuration 0, the method of determining the value $K_{PUSCH}$ may be different depending on the situation. For example, in the case of TDD UL/DL configuration 0, if scheduling information of the PUSCH to be transmitted in subframe 2 or subframe 7 is received through the PDCCH/EPDCCH in which LSB of an UL index of the uplink DCI format is 1, $K_{PUSCH}$ is assumed to be 7. Otherwise, $K_{PUSCH}$ is determined according to Table 6 above.

Although the wireless communication system has been described on the basis of the LTE system, the disclosure is not limited to the LTE system, but may be applied to various wireless communication systems such as NR and 5G. In addition, in the case where the embodiment is applied to another wireless communication system, the value k may also be changed and applied to a system using a modulation scheme corresponding to the FDD.

Figure 3:
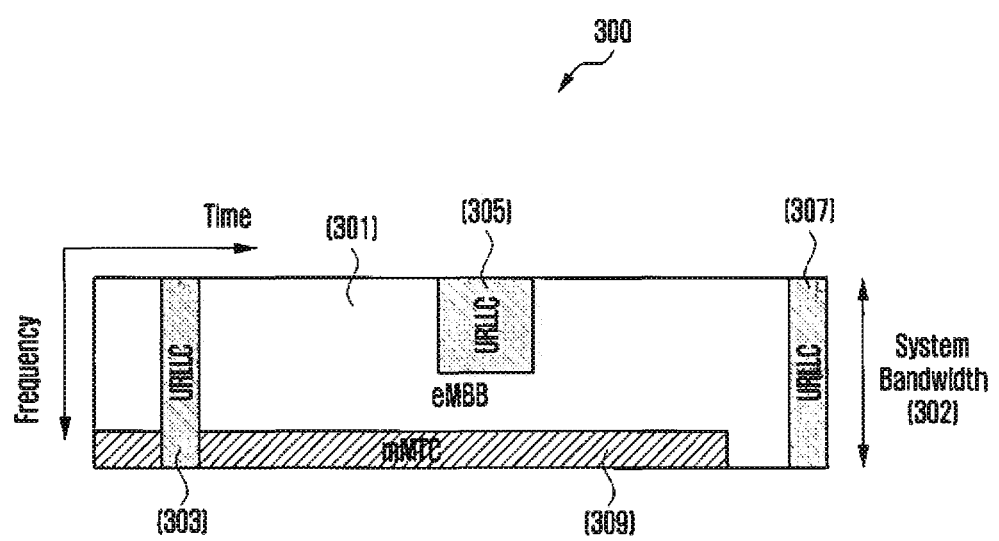
FIG. 3 is a diagram illustrating data for eMBB, URLLC, and mMTC, which is allocated in frequency-time resources in a communication system.
Figure 4:
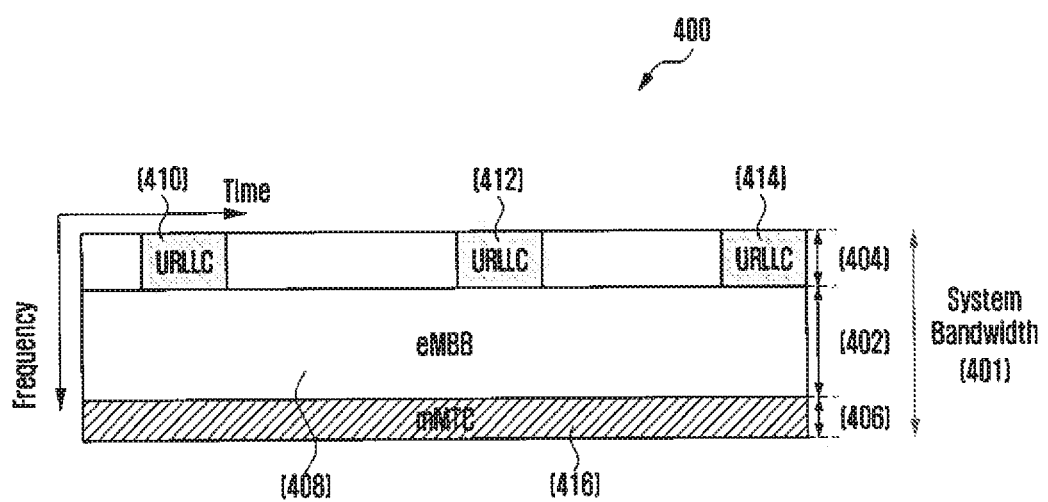
FIG. 4 is a diagram illustrating data for eMBB, URLLC, and mMTC, which is allocated in frequency-time resources in a communication system.

FIGS. 3 and 4 illustrate the allocation of data for eMBB, URLLC, and mMTC, which are services considered in the 5G or NR system, in frequency-time resources.

Referring to FIGS. 3 and 4, illustrated are schemes for allocating frequency and time resources for information transmission in respective systems.

First, FIG. 3 shows that data for eMBB, URLLC, and mMTC are allocated in the entire system frequency band 302. If URLLC data 303, 305, and 307 is generated and is required to be transmitted while the eMBB 301 and the mMTC 309 are allocated and transmitted in a specific frequency band, it is possible to transmit the URLLC data 303, 305, and 307 by emptying the portions where the eMBB 301 and the mMTC 309 have been allocated or by stopping the transmission thereof. Since the URLLC needs to reduce a latency time, among the above services, the URLLC data 303, 305, and 307 may be allocated to some of the resources 301 to which the eMBB is allocated, and may be transmitted. Of course, if the URLLC is further allocated and transmitted in the resource to which the eMBB is allocated, the eMBB data may not be transmitted in the overlapping frequency-time resources, and thus the transmission performance of the eMBB data may be lowered. That is, in the above case, eMBB data transmission failure due to the URLLC allocation may occur.

In FIG. 4, the entire system frequency band 401 may be divided into respective subbands 402, 404, and 406 used for transmitting services and data. Information related to the subband configuration may be predetermined, and the information may be transmitted from the base station to the terminal through higher signaling. Alternatively, the base station or a network node may configure the information related to the subbands at discretion, and may provide services to the terminal without separate transmission of the subband configuration information. FIG. 4 shows that a subband 402 is used for eMBB data transmission 408, a subband 404 is used for URLLC data transmission 410, 412, and 414, and a subband 406 is used for mMTC data transmission 416.

The length of the transmission time interval (TTI) used in the URLLC transmission may be shorter than the TTI length used in the eMBB or mMTC transmission through the embodiments. In addition, a response of the information related to the URLLC can be transmitted faster than that of the eMBB or mMTC, so that information can be transmitted and received with low latency.

Figure 5:
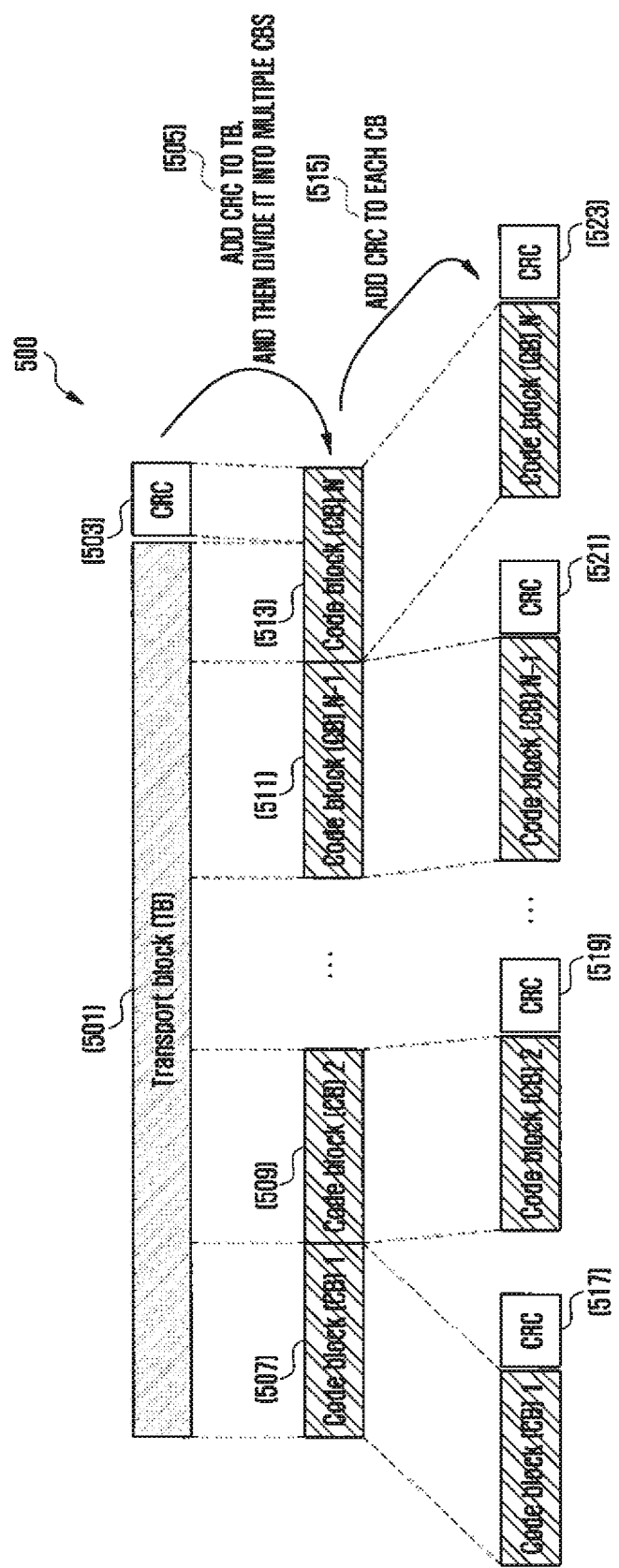
FIG. 5 is a diagram illustrating a structure in which one transport block is divided into a plurality of code-blocks and a CRC is added thereto according to an embodiment.

FIG. 5 is a diagram illustrating a process in which one transport block is divided into a plurality of code-blocks and a CRC is added thereto.

Referring to FIG. 5, a CRC 503 may be added to the front or end of a transport block (TB) 501 to be transmitted in the uplink or downlink. The CRC may have 16 bits, 24 bits, or a predetermined number of bits, or may have a variable number of bits depending on the channel state, which may be used to determine whether or not channel coding is successful. The blocks 501 and 503 to which the TB and the CRC are added may be divided into a plurality of code-blocks (CBs) 507, 509, 511, and 513 (505). The divided code block may have a predetermined maximum size, and in this case, the last code-block 513 may be smaller than other code-blocks, or may have the same size as those of other code-blocks by inserting 0, a random value, or 1 for adjustment. CRCs 517, 519, 521, and 523 may be added to the divided code-blocks (515), respectively. The CRCs may have 16 bits, 24 bits, or a predetermined number of bits, and may be used to determine whether or not channel coding is successful. However, the CRC 503 added to the TB and the CRCs 517, 519, 521, and 523 added to the code-blocks may be omitted depending on the type of channel code to be applied to the code-blocks. For example, in the case of applying an LDPC code, rather than a turbo code, to the code-blocks, the CRCs 517, 519, 521, and 523 to be inserted to the respective code-blocks may be omitted. However, even when the LDPC is applied, the CRCs 517, 519, 521, and 523 may still be added to the code-blocks. In addition, the CRCs may be added or omitted in the case where a polar code is used.

The eMBB service described below will be referred to as a first type of service, and the eMBB data will be referred to as a first type of data. The first type of service or the first type of data is not limited to the eMBB, but may be applicable to high-speed data transmission or broadband transmission. In addition, the URLLC service will be referred to as a second type of service, and the URLLC data will be referred to as a second type of data. The second type of service or the second type of data is not limited to the URLLC, but may be applicable to other systems requiring a low-latency time, requiring high-reliability transmission, or requiring both the low-latency time and the high-reliability. Further, the mMTC service will be referred as a third type of service, and the mMTC data will be referred as a third type of data. The third type of service or the third type of data is not limited to the mMTC, but may be applicable to the case where a low speed, wide coverage, or low power is required. In addition, in describing the embodiments, it may be understood that the first type of service includes or excludes the third type of service.

The structures of the physical layer channels used for transmitting the three services or data may be different between the respective types. For example, at least one of the length of a transmission time interval (TTI), a frequency resource allocation unit, a control channel structure, and a data mapping method may be different from each other.

Although three services and three pieces of data have been described above, there may be more kinds of services and data corresponding thereto. In this case, the disclosure may be applied as well.

The terms "physical channel" and "signal" in the conventional LTE or LTE-A system may be used in order to describe a method and an apparatus proposed in the embodiment. However, the disclosure may be applied to wireless communication systems other than the LTE and LTE-A systems.

As described above, the embodiment defines transmission and reception operations of a terminal and a base station for the first, second, or third type of service or data transmission and provides a detailed method for operating together the terminals receiving different types of services or data scheduling signals in the same system. In the disclosure, a first type of terminal, a second type of terminal, and a third type of terminal denote the terminals receiving the first type of service, the second type of service, the third type of service, or data scheduling signals, respectively. In the embodiment, the first type of terminal, the second type of terminal, and the third type of terminal may be the same terminal, or may be different terminals.

Hereinafter, at least one of a PHICH, an uplink scheduling grant signal, and a downlink data signal will be referred to as a first signal in the embodiment. In addition, at least one of an uplink data signal in response to an uplink scheduling grant and HARQ ACK/NACK in response to a downlink data signal will be referred to as a second signal in the disclosure. In the embodiment, among the signals transmitted from the base station to the terminal, a signal expecting a response from the terminal may be a first signal, and a signal of the terminal in response to the first signal may be a second signal. In addition, in the embodiment, the service type of the first signal may be at least one of the eMBB, the URLLC, and the mMTC, and the second signal may also correspond to at least one of the services. For example, in the LTE and LTE-A systems, PUCCH format 0 or 4 and a PHICH may be the first signal, and the second signal corresponding thereto may be a PUSCH. In addition, for example, in the LTE and LTE-A systems, a PDSCH may be the first signal, and a PUCCH or PUSCH including HARQ ACK/NACK information of the PDSCH may be the second signal. Further, a PDCCH/EPDCCH including an aperiodic CSI trigger may be the first signal, and the second signal corresponding thereto may be a PUSCH including channel measurement information.

In addition, assuming that the base station transmits the first signal in the $n^{th}$ TTI and the terminal transmits the second signal in the $(n+k)^{th}$ TTI in the following embodiments, the notification of timing to transmit the second signal from the base station to the terminal means the notification of the value "k". Alternatively, assuming that the base station transmits the first signal in the $n^{th}$ TTI and the terminal transmits the second signal in the $(n+4+a)^{th}$ TTI, the notification of timing to transmit the second signal from the base station to the terminal means the notification of an offset value "a". The offset may be defined by any of various methods, such as "n+3+a" and "n+5+a", instead of "n+4+a". Hereinafter, the offset value "a" including "n+4+a" may also be defined in any of various methods.

Although the disclosure is described on the basis of an FDD LTE system, the disclosure may also be applied to a TDD system, an NR system, and the like.

In the disclosure, higher signaling denotes a method in which the base station transmits a signal to the terminal using a downlink data channel of a physical layer or a method in which the terminal transmits a signal to the base station using an uplink data channel of a physical layer, which may be referred to as "RRC signaling", "PDCP signaling", or "MAC control element (MAC CE)".

Although the disclosure describes a method of determining the timing of transmitting the second signal after the terminal or the base station receives the first signal, the second signal may be transmitted by any of various methods. For example, although the timing at which the terminal receives a PDSCH, which is downlink data, and then transmits the HARQ ACK/NACK information corresponding to the PDSCH to the base station may follow a method of the disclosure, a method of selecting a PUCCH format to be used, selecting a PUCCH resource, or mapping HARQ ACK/NACK information with the PUSCH may follow existing methods of the LTE system.

In the disclosure, a normal mode refers to a mode using first signal and second signal transmission timings used in the conventional LTE and LTE-A systems, and it is possible to secure a signal processing time of about 3 ms including TA in the normal mode. For example, in the FDD LTE system operating in the normal mode, the transmission of the second signal in response to the first signal received by the terminal in subframe n is performed by the terminal in subframe n+4. Such transmission may be referred to as "transmission of timing n+4" in the disclosure. If the second signal in response to the first signal transmitted in subframe n+k is scheduled to be transmitted at timing n+4, it means that the second signal is transmitted in subframe n+k+4. Meanwhile, timing n+4 in the TDD system may mean that a predetermined timing relationship is performed on the assumption that the subframe in which the second signal in response to the first signal transmitted in subframe n can be most quickly transmitted is "n+4". In the TDD system, since subframe n+4 may not be available for uplink transmission, it may be impossible for the terminal to transmit the second signal in subframe n+4. Therefore, it is necessary to define a timing relationship for the second signal transmission, and in this case, timing n+4 may mean that a predetermined timing relationship is performed on the assumption that the minimum timing is subframe n+4. On the other hand, timing n+3 in the TDD system may mean that a predetermined timing relationship is performed on the assumption that the subframe in which the second signal in response to the first signal transmitted in subframe n can be most quickly transmitted is "n+3". Likewise, it is necessary to define a timing relationship for the second signal transmission, and in this case, timing n+3 may mean that a predetermined timing relationship is performed on the assumption that the minimum timing is subframe n+3.

Meanwhile, in the disclosure, the latency reduction mode denotes a mode enables the transmission timing of the second signal in response to the first signal to be faster than or equal to that in the normal mode, so that a latency time may be reduced. In the latency reduction mode, the timing may be controlled in various ways. In the disclosure, the latency reduction mode may be used interchangeably with a reduced processing time mode or the like. The latency reduction mode may be configured to the terminal supporting the latency reduction mode through higher signaling. The terminal configured in the latency reduction mode may transmit the second signal in response to the first signal, which is transmitted in subframe n, before subframe n+4. For example, in the terminal configured in the latency reduction mode, the second signal in response to the first signal transmitted in subframe n may be transmitted in subframe n+3. Such transmission may be referred to as "transmission of timing n+3" in the disclosure. If the second signal in response to the first signal transmitted in subframe n+1 is scheduled to be transmitted at timing n+3, it means that the second signal is transmitted in subframe n+4. In addition, if the second signal in response to the first signal transmitted in subframe n+2 is scheduled to be transmitted at timing n+3, it means that the second signal is transmitted in subframe n+5. That is, if the second signal in response to the first signal transmitted in subframe n+k is scheduled to be transmitted at timing n+3, it means that the second signal is transmitted in subframe n+k+3.

The disclosure will be described on the basis of the case where the lengths of the transmission time intervals (TTI) used in the normal mode and the latency reduction mode are the same. However, the disclosure may be applied to the case where the length of the TTI in the normal mode is different from the length of the TTI in the latency reduction mode.

In the embodiments of the disclosure, if the first signal is a PDSCH, the second signal may be a PUCCH or a PUSCH including HARQ-ACK information of the PDSCH. If the first signal is a PHICH or a PDCCH or an EPDCCH including uplink scheduling information, the second signal may be a PUSCH with respect to the uplink scheduling. In addition, if the first signal is a PDCCH/EPDCCH including an aperiodic CSI trigger, the second signal may be a PUSCH including channel measurement information.

In the case where the latency reduction mode is configured to the terminal through higher signaling, the base station is uncertain of the time at which the terminal receives the higher signaling. Thus, a method in which the second signal is always transmitted at a predetermined timing regardless of the configuration of the base station is required. For example, even if the base station configures the terminal so as to perform transmission of timing n+3 in the latency reduction mode, the base station cannot guarantee that the terminal gets to know exactly when the latency reduction mode configuration is valid. Therefore, a method in which the base station performs transmission of timing n+4 to the terminal while the configuration is processed may be required. That is, a method of performing transmission of timing n+4 regardless of the latency reduction mode configuration may be required. In the disclosure, a method of performing transmission of timing n+4 regardless of the latency reduction mode configuration may be used interchangeably with fallback mode transmission. Therefore, in the fallback mode transmission, the base station may consider that the second signal is transmitted at timing n+4, instead of timing n+3 or n+2, thereby executing uplink reception operation.

The fallback mode transmission may be performed in at least one of 1) the case where the first signal transmission is made in a specific downlink control information (DCI) format, 2) the case where DCI for the first signal transmission is transmitted in a specific search space, and 3) the case where DCI is transmitted using a predetermined RNTI value.

A cell-specific search space (CSS) and a UE-specific search space (USS), which may be search spaces, may be defined as follows. The control channel element (CCE) number with which a downlink control signal and a control channel of aggregation level L can be mapped in subframe k may be calculated as follows.

$$L\{(Y_k+m') \bmod \lfloor N_{CCE,k}/L \rfloor\}+i \quad \text{[Equation 3]}$$

$Y_k$ is defined as 0 in aggregation levels 4 and 8 in the CSS. In the USS, it is defined as $Y_k=(AY_{k-1}) \bmod D$, $Y_{-1}=n_{RNTI}$ is not 0, A=39827, D=65537, and $k=\lfloor n_s/2 \rfloor$, where $n_s$ is the slot number in a radio frame. In the above equation, x mod y may denote the remainder of dividing x by y. $M^{(L)}$ is the number of downlink control channels of aggregation level L. "m" may be a natural number from 0 to $M^{(L)}$, m'=m in the CSS, $m'=m+M^{(L)}{}_{n_{CI}}$ in the USS, and $n_{CI}$ may be a carrier indicator field value. The value $M^{(L)}$ may be defined as shown in Table 7 below.

TABLE 7

| Search space $S_k^{(L)}$ | | | Number of PDCCH |
|---|---|---|---|
| Type | Aggregation level L | Size [in CCEs] | candidates $M^{(L)}$ |
| US-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For example, the CCE numbers at which the control signal begins to be mapped are determined to be 0, 4, 8, and 12 at aggregation level 4 and are determined to be 0 and 8 at aggregation level 8 in the CSS. They may be varied depending on an RNTI value serving as the unique number of the terminal in the USS.

In the above method 1) in which the transmission of the first signal in a specific DCI format is used for the fallback mode transmission, for example, if downlink scheduling is performed in DCI format 1A in the conventional LTE system, the second signal may always be transmitted at timing n+4 regardless of the latency mode reduction configuration of the base station. That is, even if the terminal is configured to transmit the second signal at timing n+3 in the above method, the terminal transmits the second signal at timing n+4 if the downlink scheduling is made in DCI format 1A.

In the above method 2) in which the transmission of DCI for the first-signal transmission in a specific search space is used for the fallback mode transmission, for example, if the DCI is transmitted in a cell-common search space (CSS), the second signal may always be transmitted at timing n+4 regardless of the latency mode reduction configuration of the base station, in response to the first signal related to the DCI. That is, even if the terminal is configured to transmit the second signal at timing n+3 in the above method, the terminal transmits the second signal at timing n+4 if the DCI is transmitted in the common search space.

In the above method 3) in which the transmission of DCI using a predetermined RNTI value is used for the fallback mode transmission, for example, if the base station preconfigures an RNTI for the fallback mode transmission to the terminal, generates a PDCCH or a EPDCCH using the RNTI, and transmit DCI, the second signal may always be transmitted at timing n+4 regardless of the latency mode reduction configuration of the base station, in response to the first signal related to the DCI. That is, even if the terminal is configured to transmit the second signal at timing n+3 in the above method, the terminal transmits the second signal at timing n+4 if PDCCH or EPDCCH decoding using the RNTI value is successful.

Figure 6:
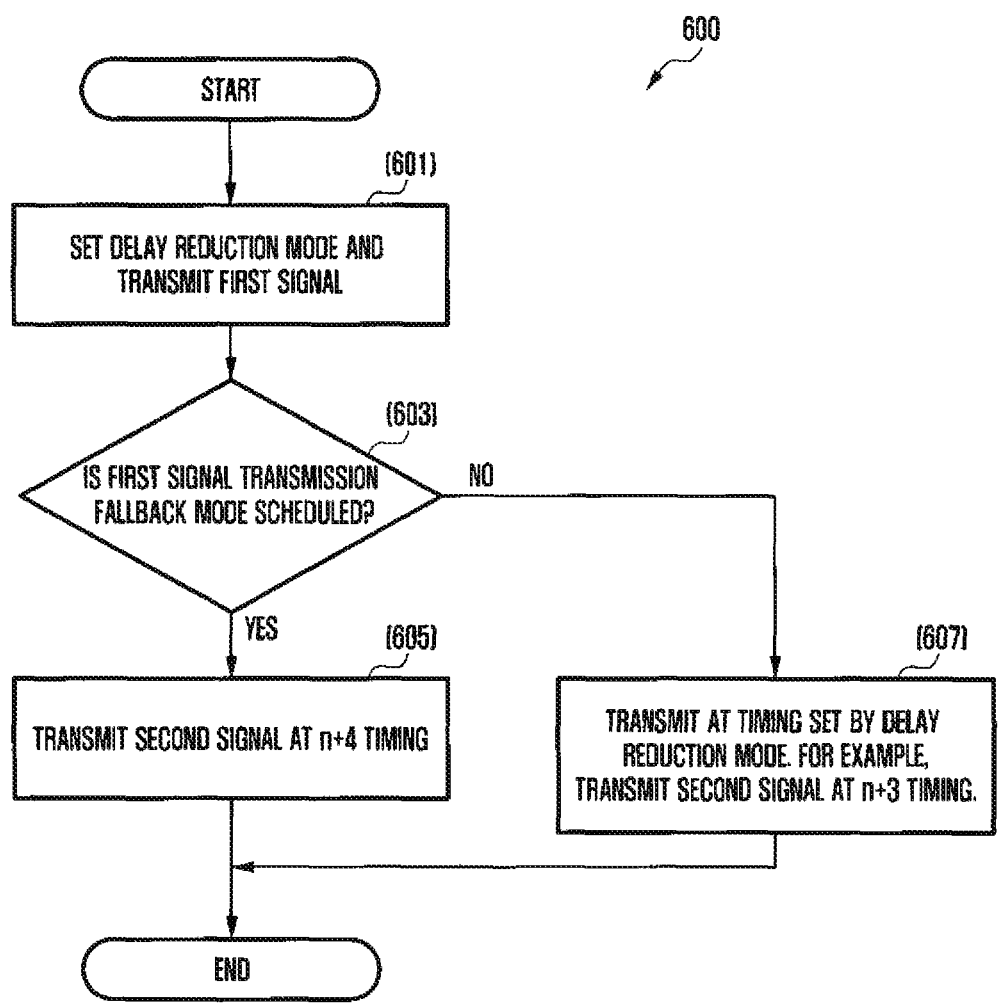
FIG. 6 is a diagram illustrating a method in which a terminal performs uplink transmission.

FIG. 6 is a diagram illustrating a method in which the terminal performs uplink transmission when the base station configures the terminal so as to be in a latency reduction mode and transmits the first signal (601). When the first signal is transmitted from the base station (601), the terminal identifies whether or not the first signal transmission corresponds to fallback mode scheduling (603). If the first signal transmission corresponds to fallback mode scheduling as a result of the identification (603), the terminal transmits the second signal at timing n+4 regardless of the latency reduction mode configuration (605). If the first signal transmission does not correspond to fallback mode scheduling as a result of the identification (603), the terminal transmits the second signal at the timing determined according to the latency reduction mode configuration, such as timing n+3 or timing n+2 (607).

In the disclosure, the transmission mode in which the fastest transmission timing of the second signal in response to the first signal transmitted in subframe n is subframe n+4 may be a normal mode, and the transmission mode in which the fastest transmission timing of the second signal in response to the first signal transmitted in subframe n is subframe n+2 or subframe n+3 may be a latency reduction mode or a signal processing time reduction mode. The subframe n+4, which is the reference transmission timing for distinguishing the normal mode from the latency reduction mode, may be varied to then be applied to the disclosure.

A description of the disclosure will be made on the basis of a method in which the terminal operates in the fallback mode according to timing n+4 in the case where DCI is detected in a specific search space, as described in the method 2) above. That is, in the case where the transmission of DCI for the first-signal transmission in a specific search space is used for the fallback mode transmission, for example, if the DCI is transmitted in a cell-common search space (CSS), the second signal may always be transmitted at timing n+4 regardless of the latency mode reduction configuration of the base station, in response to the first signal related to the DCI. Even if the terminal is configured to transmit the second signal at timing n+3 in the above method, the terminal may transmit the second signal at timing n+4 if the DCI is transmitted in the cell-common search space. On the other hand, if the DCI is transmitted in a UE-specific search space (USS), the terminal may transmit the second signal at timing n+3 as configured.

In the conventional LTE terminal, the DCI format to be detected differs depending on a transmission mode. For example, in the case where transmission mode 4 is configured, in order to receive the PDSCH transmitted using the C-RNTI, the terminal attempts to detect DCI format 1A in the CSS and USS and attempts to detect DCI format 2 in the USS. Therefore, if the latency reduction mode is configured with timing n+3, the fallback mode with timing n+4 is operated when the terminal detects DCI format 1A in the CSS. The DCI format 1A relates to downlink data transmission scheduling, and DCI format 0 may be used for fallback mode transmission in the uplink data scheduling.

Figure 7:
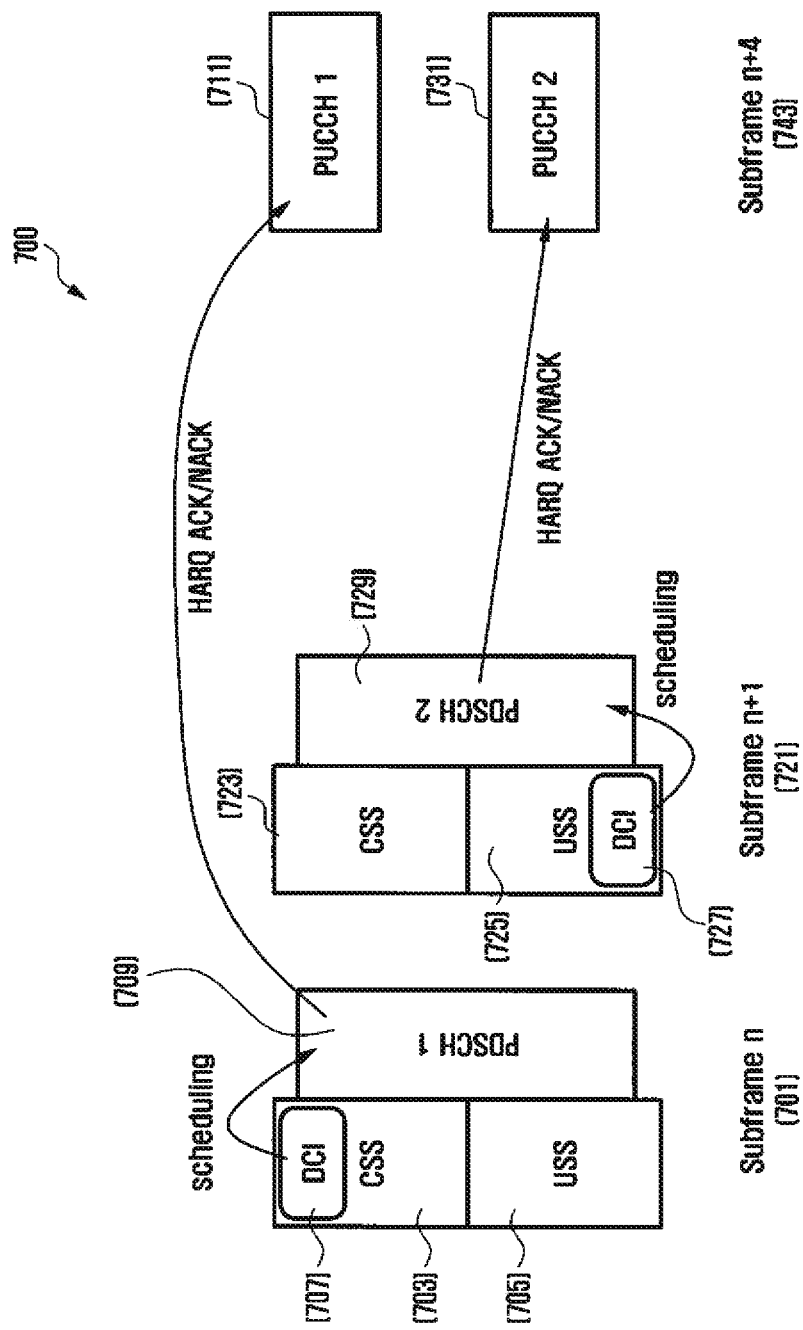
FIG. 7 is a diagram showing a second-signal transmission timing collision according to the use of a fallback mode in latency reduction mode configuration.

FIG. 7 is a diagram illustrating an example expected when a terminal in the latency reduction mode is scheduled with the fallback mode. If the terminal configured in the latency reduction mode as described above receives a scheduling signal 707 in a common search space 703 in a subframe 701 to perform the fallback mode and operates according to timing n+4, and if the terminal receives a scheduling signal 727 in a UE-specific search space 725 in the next sub-frame 721 and operates according to timing n+3, there may be a collision in which HARQ-ACK transmissions or PUSCH transmissions 711 and 731 for two scheduling signals must be performed in the same subframe 743. Therefore, in order to solve the above collision problem, if the base station transmits, to a specific terminal configured in the latency reduction mode, a scheduling signal in the common search space in one subframe such that the terminal operates according to timing n+4, the base station may not transmit a scheduling signal for operation according to timing n+3 in the next subframe, thereby preventing the collision. When the base station operates as described above, a method and an apparatus for detecting a downlink control signal of a terminal for reduction in the power consumption are provided.

In the disclosure, a first search space may be used interchangeably with a cell-specific search space (CSS), and a second search space may be used interchangeably with a UE-specific search space (USS). In addition, detection and decoding may be used interchangeably with each other in the disclosure.

The fallback mode in the disclosure is used when the base station configures the terminal as being in the latency reduction mode, and the fallback mode is not used in the normal mode. In addition, the second signal corresponding to the downlink control signal in the disclosure may be HARQ-ACK with respect to downlink data transmission scheduled by the control signal, or may be uplink data with respect to the uplink data transmission scheduling of the control signal.

In the disclosure, the uplink data transmission may be used interchangeably with the PUSCH, and the uplink control signal transmission may be used interchangeably with the PUCCH. The PUSCH may include data to be transmitted in the uplink, channel measurement information, HARQ-ACK in response to downlink data transmission, a scheduling trigger bit, and the like, and the PUCCH may include HARQ-ACK in response to downlink data transmission, channel measurement information, and a scheduling trigger bit.

In the disclosure, configuration of an absolute value mode for power control may mean that an accumulation-enabled parameter is configured to be OFF in the higher signaling, and configuration of an accumulation mode may mean that an accumulation-enabled parameter is configured to be ON in the higher signaling.

First Embodiment

The first embodiment describes a method of operating power control in the absolute value mode for uplink data transmission of a terminal configured in the latency reduction mode.

The terminal that cannot transmit a PUCCH and a PUSCH at the same time may calculate the power $P_{PUSCH,c}(i)$ used for transmission of a PUSCH to be transmitted in subframe i in a specific serving cell c as follows.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c - \Delta_{TF,c}(i) + f_c(i) \end{Bmatrix} [dBm]$$ [Equation 4]

The terminal capable of simultaneously transmitting a PUCCH and a PUSCH may calculate the power $P_{PUSCH,c}(i)$ used for transmission of a PUSCH to be transmitted in subframe i in a specific serving cell c as follows.

$$P_{PUSCH,c}(i) = \min\begin{Bmatrix} 10\log_{10}(\hat{P}_{CMAX_c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$ [Equation 5]

In the above equations, $P_{CMAX,c}(i)$ is the configured power that the terminal is able to transmit in subframe i in the serving cell c. $\hat{P}_{CMAX,c}(i)$ is a linear modification value of $P_{CMAX,c}(i)$ and $\hat{P}_{PUCCH}(i)$ is a linear modification value of $P_{PUCCH}(i)$, which is PUCCH transmission power. $M_{PUSCH,c}(i)$ is the number of PRBs allocated to be used for PUSCH transmission in subframe i in the serving cell c. $P_{O\_PUSCH,c}(i)$ is a value obtained by the parameters transmitted through higher signaling. $\alpha_c$ is one of values $\alpha_c \in \{0, 0.4, 0.5, 0.6, 0.7, 0.8, 0.9, 1\}$, which may be transmitted in higher signaling. $PL_c$ is a downlink pathloss estimation value, which may be obtained by the terminal. $\Delta_{TF,c}(i)=10\log_{10}((2^{BPREK \cdot K_s}-1)$ is a value that may be determined according to a control signal portion transmitted in the PUSCH. $\delta_{PUSCHc}$ is a value that may be configured according to TPC commands included in DCI formats for uplink scheduling such as DCI formats 0/4 or DCI formats 0A/0B/4A/4B of the PDCCH or the EPDCCH.

In the above description, if the power control is configured in the absolute value mode, instead of the accumulation mode, $f_c(i)$ may be calculated as $$f_c(i) = \delta_{PUSCH,c}(i - K_{PUSCH,sPT}).$$

$K_{PUSCH,sPT}$, which determines timing in the above expression, may be transmitted through higher signaling. For example, if the minimum signal processing time is 2 ms, that is, if the terminal is configured in the latency reduction mode with timing n+3, the terminal may assume that $K_{PUSCH,sPT}$ is 3. The expression that $K_{PUSCH,sPT}$ is 3 may mean that the power of the PUSCH to be transmitted in subframe i is determined according to a power control command transmitted in i−3.

Although the above example has been described on the basis of the FDD system, the values indicated by $K_{PUSCH,sPT}$ in the TDD may be provided as shown in Table 8 below.

TABLE 8

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 6 | 3 | 3 | | | 6 | 3 | 3 |
| 1 | | | 3 | 3 | | | | 3 | 3 | |
| 2 | | | 3 | | | | | 3 | | |
| 3 | | | 3 | 3 | 3 | | | | | |
| 4 | | | 3 | 3 | | | | | | |
| 5 | | | 3 | | | | | | | |
| 6 | | | 6 | 4 | 4 | | | 6 | 3 | |

In determining the value $K_{PUSCH,sPT}$ according to Table 8 above, a method of determining the value $K_{PUSCH,sPT}$ may differ depending on the situation in the case of TDD UL/DL configuration 0 and special subframe configurations 0 to 9. For example, if the scheduling information of the PUSCH to be transmitted in subframe 4 or subframe 9 is received through the PDCCH/EPDCCH the LSB of a UL index of the uplink DCI format of which is 1 in the case of TDD UL/DL configuration 0, $K_{PUSCH,sPT}$ is assumed to be 4. Otherwise, $K_{PUSCH,sPT}$ is determined according to Table 8 above.

Since the special subframe requires power control of uplink data transmission in the case of TDD UL/DL configurations 1 to 5 and special subframe configuration 10, the value $K_{PUSCH,sPT}$ may be determined according to Table 9, instead of Table 8 above.

TABLE 9

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 1 | | | 5 | 3 | 3 | | | 5 | 3 | 3 |
| 2 | | | 3 | 3 | 3 | | | 3 | 3 | |
| 3 | | | 3 | 3 | 3 | 3 | | | | |
| 4 | | | 3 | 3 | 3 | | | | | |
| 5 | | | 3 | 3 | | | | | | |

In the case of TDD UL/DL configuration 0 and special subframe configuration 10, the value $K_{PUSCH,sPT}$ may be determined according to Table 10 or 11, instead of Table 8 above.

TABLE 10

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | 5 | 6 | 3 | 4 | | 5 | 6 | 3 | 4 |

TABLE 11

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 6 | 6 | 3 | 3 | | | 6 | 6 | 3 | 3 |

In the case of TDD UL/DL configuration 6 and special subframe configuration 10, the value $K_{PUSCH, sPT}$ may be determined according to Table 12 or 13, instead of Table 8 above.

TABLE 12

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 6 | | | 5 | 3 | 3 | 4 | | 5 | 6 | 3 | |

TABLE 13

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 6 | | | 5 | 3 | 3 | 3 | | 6 | 6 | 3 | |

Alternatively, as another example, in the case of TDD UL/DL configuration 0 and special subframe configurations 0 to 9, the value $K_{PUSCH, sPT}$ may be determined according to Table 14 or 15, instead of Table 8 above.

TABLE 14

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 6 | 3 | 4 | | | | 6 | 3 | 4 |

TABLE 15

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 6 | 3 | 3 | | | | 6 | 3 | 3 |

Alternatively, as another example, in the case of TDD UL/DL configuration 6 and special subframe configurations 0 to 9, the value $K_{PUSCH, sPT}$ may be determined according to Table 16, instead of Table 8 above.

TABLE 16

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 6 | 4 | 4 | | | | 6 | 3 | |

The method applied to the embodiment corresponds to the case where the terminal configured in the latency reduction mode receives an uplink scheduling or downlink scheduling signal in a manner other than the fallback mode. That is, the described operation relates to the case where the terminal is scheduled to operate using timing n+3, and if the terminal is scheduled to follow timing n+4 in the fallback mode, the terminal operates according to the conventional method using $K_{PUSCH}$, instead of $K_{PUSCH, sPT}$. That is, for the FDD system, $f_c(i)$ may be determined by a method using $K_{PUSCH}$ of 4, instead $K_{PUSCH, sPT}$ of 3.

In Table 8, it may be possible to define $K_{PUSCH, sPT}$ using other values in some cases for TDD UL/DL configurations 0 and 6.

Second Embodiment

The second embodiment describes a method of operating power control in the accumulation mode for uplink transmission of a terminal configured in the latency reduction mode.

The terminal that cannot transmit a PUCCH and a PUSCH at the same time may calculate the power $P_{PUSCH,c}(i)$ used for transmission of a PUSCH to be transmitted in subframe i in a specific serving cell c as follows.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [dBm] \quad \text{[Equation 6]}$$

The terminal capable of simultaneously transmitting a PUCCH and a PUSCH may calculate the power $P_{PUSCH,c}(i)$ used for transmission of a PUSCH to be transmitted in subframe i in a specific serving cell c as follows.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [dBm] \quad \text{[Equation 7]}$$

In the above equations, $P_{CMAX,c}(i)$ is the configured power that the terminal is able to transmit in subframe i in the serving cell c. $\hat{P}_{CMAX,c}(i)$ is a linear modification value of $P_{CMAX,c}(i)$, and $\hat{P}_{PUCCH}(i)$ is a linear modification value of $P_{PUCCH}(i)$, which is PUCCH transmission power. $M_{PUSCHc}(i)$ is the number of PRBs allocated to be used for PUSCH transmission in subframe i in the serving cell c. $P_{O\_PUSCH,c}(j)$ is a value obtained by the parameters transmitted through higher signaling. $\alpha_c$ is one of values $\alpha_c \in \{0, 0.4, 0.5, 0.6, 0.7, 0.8, 0.9, 1\}$, which may be transmitted in higher signaling. $PL_c$ is a downlink pathloss estimation value, which may be obtained by the terminal. $\Delta_{TF,c}(i)=10\log_{10}((2^{BPRE \cdot K_s}-1) \cdot \beta_{offset}^{PUSCH})$ is a value that may be determined according to a control signal portion transmitted in the PUSCH. $\delta_{PUSCH,c}$ is a value that may be configured according to TPC commands included in DCI formats 0/4 of the PDCCH or the EPDCCH. In the following description, $\delta_{PUSCH,c, 3/3A}$ is a value that may be configured according to TPC commands included in DCI formats for power control such as DCI formats 3/3A of the PDCCH or the EPDCCH.

In the above description, $f_c(i)$ may be calculated by at least one of the methods proposed below.

Method 1: if the power control is configured in the accumulation mode, $f_c(i)$ may be calculated as $f_c(i)=f_c(i-1)+\delta_{PUSCH,c}(i-K_{PUSCH, sPT})$.

Method 2: if the power control is configured in the accumulation mode, $f_c(i)$ may be calculated as $f_c(i)=f_c(i-1)+\delta_{PUSCH,c}(i-K_{PUSCH, sPT})+\delta_{PUSCH, c, 3/3A}(i-K_{PUSCH})$ $K_{PUSCH}$ is 4 in the FDD system, and may be determined according to Table 6 in the TDD system.

Method 3: if there is a PUSCH to be transmitted in subframe i, $f_c(i)$ may be calculated as $f_c(i)=f_c(i-1)+\delta_{PUSCH, c}(i-K_{PUSCH, sPT})$, and if there is no PUSCH to be transmitted in subframe i, $f_c(i)$ may be calculated as $$f_c(i)=f_c(i-1)+\delta_{PUSCH,c,3/3A}(i-K_{PUSCH}).$$

$K_{PUSCH, sPT}$, which determines timing in the above expression, may be transmitted through higher signaling. For example, if the minimum signal processing time is 2 ms, that is, if the terminal is configured in the latency reduction mode with timing n+3, the terminal may assume that $K_{PUSCH, sPT}$ is 3. The expression that $K_{PUSCH, sPT}$ is 3 may mean that the power of the PUSCH to be transmitted in subframe i is determined according to a power control command transmitted in i−3.

Although the above example has been described on the basis of the FDD system, the values indicated by $K_{PUSCH, sPT}$ in the TDD may be provided as shown in Table 8 of the first embodiment.

A method of determining the value $K_{PUSCH, sPT}$ may differ depending on the situation in the case of TDD UL/DL configuration 0. For example, if the scheduling information of the PUSCH to be transmitted in subframe 4 or subframe 9 is received through the PDCCH/EPDCCH the LSB of a UL index of the uplink DCI format of which is 1 in the case of TDD UL/DL configuration 0, $K_{PUSCH, sPT}$ is assumed to be 4. Otherwise, $K_{PUSCH, sPT}$ is determined according to Table 8 above.

In determining the value $K_{PUSCH, sPT}$ according to Table 8 above, a method of determining the value $K_{PUSCH, sPT}$ may differ depending on the situation in the case of TDD UL/DL configuration 0 and special subframe configurations 0 to 9. For example, if the scheduling information of the PUSCH to be transmitted in subframe 4 or subframe 9 is received through the PDCCH/EPDCCH the LSB of a UL index of the uplink DCI format of which is 1 in the case of TDD UL/DL configuration 0, $K_{PUSCH, sPT}$ is assumed to be 4. Otherwise, $K_{PUSCH, sPT}$ is determined according to Table 8 above.

Since the special subframe requires power control of uplink data transmission in the case of TDD UL/DL configurations 1 to 5 and special subframe configuration 10, the value $K_{PUSCH, sPT}$ may be determined according to Table 9 of the first embodiment, instead of Table 8 above.

In the case of TDD UL/DL configuration 0 and special subframe configuration 10, the value $K_{PUSCH, sPT}$ may be determined according to Table 10 or 11 in the first embodiment, instead of Table 8 above.

In the case of TDD UL/DL configuration 6 and special subframe configuration 10, the value $K_{PUSCH, sPT}$ may be determined according to Table 12 or 13 in the first embodiment, instead of Table 8 above.

Alternatively, as another example, in the case of TDD UL/DL configuration 0 and special subframe configurations 0 to 9, the value $K_{PUSCH, sPT}$ may be determined according to Table 14 or 15 in the first embodiment, instead of Table 8 above.

Alternatively, as another example, in the case of TDD UL/DL configuration 6 and special subframe configurations 0 to 9, the value $K_{PUSCH, sPT}$ may be determined according to Table 16 in the first embodiment, instead of Table 8 above.

The method applied to the embodiment corresponds to the case where the terminal configured in the latency reduction mode receives an uplink scheduling or downlink scheduling signal in a manner other than the fallback mode. That is, the described operation relates to the case where the terminal is scheduled to operate using timing n+3, and if the terminal is scheduled to follow timing n+4 in the fallback mode, the terminal operates according to the conventional method using $K_{PUSCH}$, instead of $K_{PUSCH, sPT}$. That is, for the FDD system, $f_c(i)$ may be determined by a method using $K_{PUSCH}$ of 4, instead $K_{PUSCH, sPT}$ of 3.

In Table 8, it may be possible to define $K_{PUSCH, sPT}$ using other values in some cases for TDD UL/DL configurations 0 and 6.

Third Embodiment

The third embodiment describes a method for receiving information on uplink power control when a terminal configured in the latency reduction mode receives downlink control information.

In the FDD system, if the terminal configured in the latency reduction mode with timing n+3 receives DCI for power control, such as DCI formats 3/3A, in subframe n and receives DCI for uplink scheduling, such as DCI 0/4, in subframe n+1 for timing n+3, instead of the fallback mode, uplink data transmission is performed in subframe n+4. In this case, it is necessary to determine whether the power control command to be used for the uplink data transmission follows the DCI for power control, such as DCI formats 3/3A, received in subframe n or the DCI for uplink scheduling, such as DCI 0/4, received in subframe n+1, or whether or not to control power by accumulating the DCI for power control and the DCI for uplink scheduling.

In the case above, the terminal controls power according to the DCI for uplink scheduling, such as DCI 0/4, received in subframe n+1.

The above operation may be described and applied as follows.

If the UE is not configured with higher layer parameter ReducedProcessingTime for serving cell c and if DCI format 0/4 for serving cell c and DCI format 3/3A are both detected in the same subframe, then the UE shall use the delta provided in DCI format 0/4.

If the UE is configured with higher layer parameter ReducedProcessingTime for serving cell c and if DCI format 0/4 for serving cell c is detected in a subframe and if DCI format 3/3A is detected in the following subframe, then the UE shall use the delta provided in DCI format 0/4.

Alternatively, the above operation may be applied as follows.

If the UE is not configured with higher layer parameter ReducedProcessingTime for serving cell c and if DCI format 0/4 for serving cell c and DCI format 3/3A are both detected in the same subframe, then the UE shall use the delta provided in DCI format 0/4.

If the UE is configured with higher layer parameter ReducedProcessingTime for serving cell c and if DCI format 0/4 for serving cell c is detected in subframe $i-K_{PUSCH, sPT}$ and if DCI format 3/3A is detected in subframe $i-K_{PUSCH}$, then the UE shall use the delta provided in DCI format 0/4 for PUSCH transmission in subframe i.

In the above description, $K_{PUSCH, sPT}$ is 3 in the FDD system and is determined according to Table 8 in the TDD system. $K_{PUSCH}$ is 4 in the FDD system and is determined according to Table 6 in the TDD system.

Although a power control method for PUSCH transmission has been described above, it may be applied to determine the power for sounding reference signal (SRS) transmission or PUCCH transmission using $f_c(i)$ described above. That is, the third embodiment may be applied to the control of the power for uplink transmission of the terminal configured in the latency reduction mode.

Although the operation of the latency reduction mode has been described as using timing n+3 in the above embodiments, this is only a specific example for the convenience of description of the disclosure, and is not intended to limit the scope of the disclosure. That is, the latency reduction mode of the disclosure may also be applied to the configuration in which the second signal is transmitted at timing n+2 or n+3.

Figure 8:
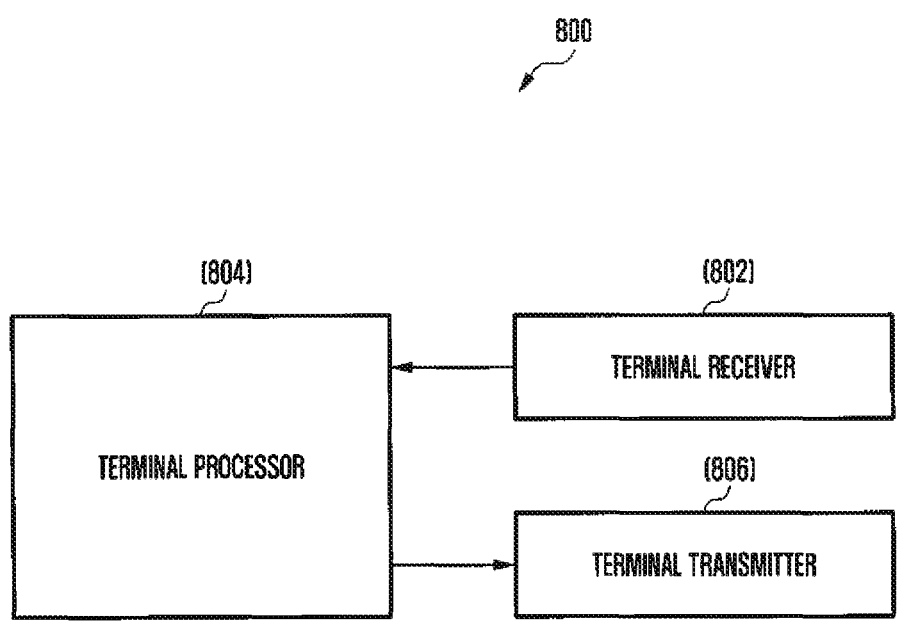
FIG. 8 is a block diagram illustrating the structure of a terminal according to embodiments.
Figure 9:
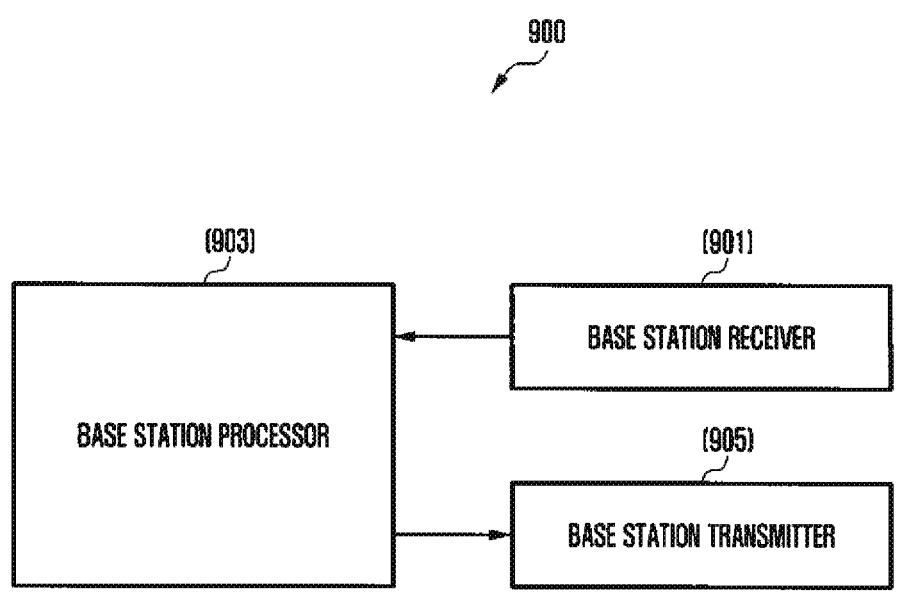
FIG. 9 is a block diagram illustrating the structure of a base station according to embodiments.

In order to perform the above-described embodiments of the disclosure, transmitters, receivers, and processors of the terminal and the base station are shown in FIGS. 8 and 9, respectively. The first to third embodiments show transmission and reception methods of a base station and a terminal in order to perform the operation of the control signal detection method according to the search space. To this end, receivers, processors, and transmitters of the base station and the terminal must operate according to the embodiments.

More specifically, FIG. 8 is a block diagram illustrating an internal structure of a terminal according to an embodiment of the disclosure. As shown in FIG. 8, the terminal of the disclosure may include a terminal receiver 802, a terminal transmitter 806, and a terminal processor 804. The terminal receiver 802 and the terminal transmitter 806 may be collectively referred to as a transceiver in the embodiment of the disclosure. The transceiver may transmit and receive signals to and from the base station. The signals may include control information and data. To this end, the transceiver may include an RF transmitter for up-converting and amplifying the frequency of a transmitted signal, an RF receiver for amplifying the received signal with low noise and down-converting the frequency thereof, and the like. In addition, the transceiver may receive a signal through a wireless channel, may output the signal to the terminal processor 804, and may transmit the signal output from the terminal processor 804 through a wireless channel. The terminal processor 804 may control a series of processes such that the terminal operates according to the embodiment of the disclosure described above. For example, the terminal receiver 802 may receive a signal including a control signal, and the terminal processor 804 may determine power for uplink transmission according to the received control information. Thereafter, the terminal transmitter 806 transmits the second signal using the power for the uplink transmission determined by the processor.

FIG. 9 is a block diagram illustrating an internal structure of a base station according to an embodiment of the disclosure. As shown in FIG. 9, the base station of the disclosure may include a base station receiver 901, a base station transmitter 905, and a base station processor 903. The base station receiver 901 and the base station transmitter 905 may be collectively referred to as a transceiver in the embodiment of the disclosure. The transceiver may transmit and receive signals to and from the terminal. The signals may include control information and data. To this end, the transceiver may include an RF transmitter for up-converting and amplifying the frequency of a transmitted signal, an RF receiver for amplifying the received signal with low noise and down-converting the frequency thereof, and the like. In addition, the transceiver may receive a signal through a wireless channel, may output the signal to the base station processor 903, and may transmit the signal output from the base station processor 903 through a wireless channel. The base station processor 903 may control a series of processes such that the base station operates according to the embodiment of the disclosure described above. For example, the base station processor may identify the power for uplink transmission, may determine an appropriate transmission power, and may notify the terminal of the same.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, embodiments 1 and 2 may be partially combined so as to operate a base station and a terminal. Further, although the above embodiments have been described on the basis of the LTE/LTE-A system, it may be possible to implement other variant embodiments on the basis of the technical idea of the embodiments in other systems such as 5G and NR systems.

The invention claimed is:

1. A method performed by a user equipment (UE) configured with a short processing time in a wireless communication system, the method comprising:

receiving, from a base station, downlink control information (DCI) in a UE-specific search space (USS), the DCI scheduling an uplink transmission;

identifying a parameter associated with a reception timing of a power control command for the uplink transmission;

receiving, from the base station, the power control command based on the identified parameter;

identifying a transmission power for the uplink transmission based on the power control command; and transmitting, to the base station, an uplink signal based on the identified transmission power in a subframe determined based on the DCI which is detected in the USS, wherein an interval between the reception timing of the power control command and a transmission timing of the uplink signal for the UE configured with the short processing time is less than the interval for a UE not configured with the short processing time.

2. The method of claim 1, wherein the power control command is received in a subframe corresponding to the identified parameter.

3. The method of claim 1, wherein the parameter is identified from a first group of parameters, in case that the UE is configured with information associated with a physical uplink shared channel (PUSCH) transmission in a special subframe, and wherein the parameter is identified from a second group of parameters, in case that the UE is not configured with the information.

4. The method of claim 3, wherein the first group is given as following Table 1, and wherein the second group is given as following Table 2:

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | 6 | 6 | 3 | 3 | — | 6 | 6 | 3 | 3 |
| 1 | — | 5 | 3 | 3 | — | — | 5 | 3 | 3 | — |
| 2 | — | 3 | 3 | — | — | — | 3 | 3 | — | — |
| 3 | — | 3 | 3 | 3 | 3 | — | — | — | — | — |
| 4 | — | 3 | 3 | 3 | — | — | — | — | — | — |
| 5 | — | 3 | 3 | — | — | — | — | — | — | — |
| 6 | — | 5 | 3 | 3 | 4 | — | 5 | 6 | 3 | —, | and

TABLE 2

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 3 | — | — | 6 | 3 | 3 |
| 1 | — | — | 3 | 3 | — | — | — | 3 | 3 | — |
| 2 | — | — | 3 | — | — | — | — | 3 | — | — |
| 3 | — | — | 3 | 3 | 3 | — | — | — | — | — |
| 4 | — | — | 3 | 3 | — | — | — | — | — | — |
| 5 | — | — | 3 | — | — | — | — | — | — | — |
| 6 | — | — | 6 | 4 | 4 | — | — | 6 | 3 | —, | where the subframe number n in the Table 1 and the Table 2 indicates the transmission timing of the uplink signal.

5. A user equipment (UE) configured with a short processing time in a wireless communication system, the UE comprising:
   a transceiver configured to transmit and receive signals; and
   a controller coupled with the transceiver and configured to:
   receive, from a base station, downlink control information (DCI) in a UE-specific search space (USS), the DCI scheduling an uplink transmission,
   identify a parameter associated with a reception timing of a power control command for the uplink transmission,
   receive, from the base station, the power control command based on the identified parameter,
   identify a transmission power for the uplink transmission based on the power control command, and
   transmit, to the base station, an uplink signal based on the identified transmission power in a subframe determined based on the DCI which is detected in the USS,
   wherein an interval between the reception timing of the power control command and a transmission timing of the uplink signal for the UE configured with the short processing time is less than the interval for a UE not configured with the short processing time.

6. The terminal of claim 5, wherein the power control command is received in a subframe corresponding to the identified parameter.

7. The terminal of claim 5,
   wherein the parameter is identified from a first group of parameters, in case that the UE is configured with information associated with a physical uplink shared channel (PUSCH) transmission in a special subframe, and
   wherein the parameter is identified from a second group of parameters, in case that the UE is not configured with the information.

8. The terminal of claim 7, wherein the first group is given as following Table 1, and wherein the second group is given as following Table 2:

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | 6 | 6 | 3 | 3 | — | 6 | 6 | 3 | 3 |
| 1 | — | 5 | 3 | 3 | — | — | 5 | 3 | 3 | — |
| 2 | — | 3 | 3 | — | — | — | 3 | 3 | — | — |
| 3 | — | 3 | 3 | 3 | 3 | — | — | — | — | — |
| 4 | — | 3 | 3 | 3 | — | — | — | — | — | — |
| 5 | — | 3 | 3 | — | — | — | — | — | — | — |
| 6 | — | 5 | 3 | 3 | 4 | — | 5 | 6 | 3 | —, | and

TABLE 2

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 3 | — | — | 6 | 3 | 3 |
| 1 | — | — | 3 | 3 | — | — | — | 3 | 3 | — |
| 2 | — | — | 3 | — | — | — | — | 3 | — | — |
| 3 | — | — | 3 | 3 | 3 | — | — | — | — | — |
| 4 | — | — | 3 | 3 | — | — | — | — | — | — |
| 5 | — | — | 3 | — | — | — | — | — | — | — |
| 6 | — | — | 6 | 4 | 4 | — | — | 6 | 3 | —, | where the subframe number n in the Table 1 and the Table 2 indicates the transmission timing of the uplink signal.

9. A method performed by a base station in a wireless communication system, the method comprising:
   transmitting, to a user equipment (UE), downlink control information (DCI) in a UE-specific search space (USS), the DCI scheduling an uplink transmission;
   identifying a parameter associated with a transmission timing of a power control command for the uplink transmission;
   transmitting, to the UE, the power control command based on the identified parameter; and
   receiving, from the UE, an uplink signal in a subframe determined based on the DCI which is detected in the USS,
   wherein base station configures the UE with a short processing time,
   wherein a transmission power of the uplink signal is identified based on the power control command, and
   wherein an interval between the transmission timing of the power control command and a reception timing of the uplink signal for the UE configured with the short processing time is less than the interval for a UE not configured with the short processing time.

10. The method of claim 9, wherein the power control command is transmitted in a subframe corresponding to the identified parameter.

11. The method of claim 9,
   wherein the parameter is identified from a first group of parameters, in case that the base station configures the UE with information associated with a physical uplink shared channel (PUSCH) transmission in a special subframe, and
   wherein the parameter is identified from a second group of parameters, in case that the base station does not configure the UE with the information.

12. The method of claim 11,
wherein the first group is given as following Table 1, and wherein the second group is given as following Table 2:

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | 6 | 6 | 3 | 3 | — | 6 | 6 | 3 | 3 |
| 1 | — | 5 | 3 | 3 | — | — | 5 | 3 | 3 | — |
| 2 | — | 3 | 3 | — | — | — | 3 | 3 | — | — |
| 3 | — | 3 | 3 | 3 | 3 | — | — | — | — | — |
| 4 | — | 3 | 3 | 3 | — | — | — | — | — | — |
| 5 | — | 3 | 3 | — | — | — | — | — | — | — |
| 6 | — | 5 | 3 | 3 | 4 | — | 5 | 6 | 3 | —, | and

TABLE 2

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 3 | — | — | 6 | 3 | 3 |
| 1 | — | — | 3 | 3 | — | — | — | 3 | 3 | — |
| 2 | — | — | 3 | — | — | — | — | 3 | — | — |
| 3 | — | — | 3 | 3 | 3 | — | — | — | — | — |
| 4 | — | — | 3 | 3 | — | — | — | — | — | — |
| 5 | — | — | 3 | — | — | — | — | — | — | — |
| 6 | — | — | 6 | 4 | 4 | — | — | 6 | 3 | —, | where the subframe number n in the Table 1 and the Table 2 indicates the transmission timing of the uplink signal.

13. A base station in a wireless communication system, the base station comprising:
a transceiver configured to transmit and receive signals; and
a controller coupled with the transceiver and configured to:
transmit, to a user equipment (USS), downlink control information (DCI) in a UE-specific search space (USS), the DCI scheduling an uplink transmission,
identify a parameter associated with a transmission timing of a power control command for the uplink transmission,
transmit, to the UE, the power control command based on the identified parameter, and
receive, from the UE, an uplink signal in a subframe determined based on the DCI which is detected in the USS,
wherein the base station configured UE with a short processing time,
wherein a transmission power for the uplink signal is identified based on the power control command, and
wherein an interval between the transmission timing of the power control command and a reception timing of the uplink signal for the UE configured with the short processing time is less than the interval for a UE not configured with the short processing time.

14. The base station of claim 13, wherein the power control command is transmitted in a subframe corresponding to the identified parameter.

15. The base station of claim 13,
wherein the parameter is identified from a first group of parameters, in case that the base station configure the UE with information associated with a physical uplink shared channel (PUSCH) transmission in a special subframe,
wherein the parameter is identified from a second group of parameters, in case that the base station does not configure the UE with the information.

16. The base station of claim 15, wherein the first group is given as following Table 1, and wherein the second group is given as following Table 2:

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | 6 | 6 | 3 | 3 | — | 6 | 6 | 3 | 3 |
| 1 | — | 5 | 3 | 3 | — | — | 5 | 3 | 3 | — |
| 2 | — | 3 | 3 | — | — | — | 3 | 3 | — | — |
| 3 | — | 3 | 3 | 3 | 3 | — | — | — | — | — |
| 4 | — | 3 | 3 | 3 | — | — | — | — | — | — |
| 5 | — | 3 | 3 | — | — | — | — | — | — | — |
| 6 | — | 5 | 3 | 3 | 4 | — | 5 | 6 | 3 | —, | and

TABLE 2

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 3 | 3 | — | — | 6 | 3 | 3 |
| 1 | — | — | 3 | 3 | — | — | — | 3 | 3 | — |
| 2 | — | — | 3 | — | — | — | — | 3 | — | — |
| 3 | — | — | 3 | 3 | 3 | — | — | — | — | — |
| 4 | — | — | 3 | 3 | — | — | — | — | — | — |
| 5 | — | — | 3 | — | — | — | — | — | — | — |
| 6 | — | — | 6 | 4 | 4 | — | — | 6 | 3 | —, | where the subframe number n in the Table 1 and the Table 2 indicates the transmission timing of the uplink signal.

* * * * *